US009258523B2

(12) United States Patent
Sobti et al.

(10) Patent No.: US 9,258,523 B2
(45) Date of Patent: Feb. 9, 2016

(54) APPARATUS AND METHOD FOR INTEGRATING COMPUTING DEVICES

(71) Applicant: Arun Sobti & Associates LLC, South Barrington, IL (US)

(72) Inventors: Arun Sobti, South Barrington, IL (US); Rajendra A Panchal, South Barrington, IL (US); Darshana R. Panchal, South Barrington, IL (US)

(73) Assignee: Arun Sobti & Associates LLC, South Barrington, IL (US)

(*) Notice: Subject to any disclaimer, the term of this patent is extended or adjusted under 35 U.S.C. 154(b) by 331 days.

(21) Appl. No.: 13/706,348

(22) Filed: Dec. 5, 2012

(65) Prior Publication Data
US 2013/0342638 A1    Dec. 26, 2013

Related U.S. Application Data

(63) Continuation-in-part of application No. 12/945,406, filed on Nov. 12, 2010.

(60) Provisional application No. 61/260,435, filed on Nov. 12, 2009.

(51) Int. Cl.
| | |
|---|---|
| *G06F 1/16* | (2006.01) |
| *H04M 1/02* | (2006.01) |
| *H04M 1/04* | (2006.01) |
| *H04N 7/15* | (2006.01) |

(52) U.S. Cl.
CPC .............. *H04N 7/15* (2013.01); *G06F 1/1632* (2013.01); *G06F 1/1656* (2013.01); *G06F 1/1698* (2013.01); *H04M 1/0254* (2013.01); *H04M 1/04* (2013.01)

(58) Field of Classification Search
CPC ........ H04N 7/15; H04M 1/0254; H04M 1/04; H04M 1/6033; G06F 1/1698; G06F 1/1632; G06F 1/1656
USPC .......... 370/260, 261; 455/90.2, 90.3, 95, 100, 455/425, 426.1, 550.1, 552.1, 554.2, 556.1, 455/556.2, 557, 569.1, 575.1; 348/14.02; 709/204; 715/753
See application file for complete search history.

(56) References Cited

U.S. PATENT DOCUMENTS

| | | | |
|---|---|---|---|
| 2001/0044321 A1* | 11/2001 | Ausems et al. | 455/556 |
| 2002/0093531 A1* | 7/2002 | Barile | 345/753 |
| 2005/0093970 A1* | 5/2005 | Abe et al. | 348/14.05 |
| 2007/0004450 A1* | 1/2007 | Parikh | 455/556.1 |
| 2011/0216060 A1* | 9/2011 | Weising et al. | 345/419 |
| 2012/0014056 A1* | 1/2012 | Chen et al. | 361/679.41 |

* cited by examiner

*Primary Examiner* — Dinh P Nguyen
(74) *Attorney, Agent, or Firm* — LeClairRyan, a Professional Corporation

(57) ABSTRACT

Methods, systems, and apparatus are provided for physically and/or logically combining two or more smart devices to enhance user experience and help efficiently design, create, implement, or execute desired applications. According to one embodiment, system of the present disclosure provides a smart device apparatus having one or more processors, a communication interface device, and one or more internal data storage devices that are operatively coupled to the one or more processors. The smart device or a sleeve thereof further includes a housing, also interchangeably referred to as a slot or a docking basin, where the housing is configured to physically receive a second smart device and couple the smart device with the second smart device.

12 Claims, 32 Drawing Sheets

APPARATUS AND METHOD FOR INTEGRATING COMPUTING DEVICES

COPYRIGHT NOTICE

Contained herein is material that is subject to copyright protection. The copyright owner has no objection to the facsimile reproduction of the patent disclosure by any person as it appears in the Patent and Trademark Office patent files or records, but otherwise reserves all rights to the copyright whatsoever.

RELATED APPLICATIONS

This application claims the benefit of priority to co-pending U.S. Provisional application No. 61/630,117, filed Dec. 5, 2011, and entitled "Table PC and Smartphone Docketing Accessories and Applications for Joint Smart Devices," which is incorporated by reference in its entirety herein.

This application is also a Continuation-In-Part of co-pending U.S. patent application Ser. No. 12/945,406, filed Nov. 12, 2010, and entitled, "An End-User Platform Having an Integral Basin to Operationally and Physically Receive a Portable Cellular-Telephony Transceiver," which claims priority to U.S. Provisional application No. 61/260,435, filed Nov. 12, 2009, and entitled, "Method and Apparatus for Hosting a Smartphone Device to Use the Combined System as a Notebook, Netbook, Tablet or a Laptop."

BACKGROUND

1. Field

Embodiments of the present disclosure generally relate to the field of computing devices. In particular to an aspect, various embodiments relate to methods and systems for configuring two or more smart devices with each other to enable enhanced functionalities through their combination.

2. Description of the Related Art

Portable cellular-telephony devices have evolved over the years and now include the so-called smart-devices including smart phones, tablet PCs, smart cameras, and surface computers, among other such devices, which are often highly-capable portable computational platforms and offer features and functionality far beyond merely permitting the end user to conduct a wireless voice communication with another party. Such features include high speed data processing, browsing internet, and viewing multimedia content, among other such features. In fact, at present, the development of applications in the domain of smart devices represents an area of keen interest and great application of ingenuity and resources.

As a result, many end users of smart devices rely greatly upon their respective devices for an increasingly diverse and growing number of services and capabilities and harbor expectations for even more of the same going forward. That said, the form factor and size limitations of such devices presents a growing source of limitation and frustration for application designers, service providers, and end users. This is because the ultimate value and usability of a given application can be partially or wholly frustrated by the inherent limitations of such a device. Furthermore, existing solutions that aim at providing new and powerful applications do not intend combining smart devices that harness the features, specifications, or configurations of each other to enhance the overall user experience and significantly improve the execution of desired applications There is therefore a need for systems and methods that enable efficient and intelligent physical or logical combination of two or more computing devices, such as smart devices, to improve the ability of user to design, create, implement, and execute desired applications.

SUMMARY

Methods, systems, and apparatus are provided for physically and/or logically combining two or more computing devices, such as smart devices, to enhance user experience and help efficiently design, create, implement, or execute desired applications. Smart devices of the present disclosure can include, but are not limited to, smart-phone, mobile device, a tablet PC, hand-held pads, smart cameras, interactive display boards, and surface computers, among other devices having similar form factor.

According to one embodiment, a system provides a smart device apparatus having one or more processors, a communication interface device, and one or more internal data storage devices that are operatively coupled to the one or more processors. The smart device further includes a housing, also interchangeably referred to as a slot or a docking basin hereinafter, where the housing is configured to physically couple the smart device with a second smart device.

In another embodiment, a system also provides a sleeve of a smart device, wherein the sleeve is configured to hold or cover a first smart device, wherein the sleeve has a housing configured therein, which housing is configured to position a second smart device within the housing and electrically couple the first smart device with the second smart device.

In yet another embodiment, a system provides a video conferencing apparatus having a base configured to position at least one speaker and one microphone. The apparatus can further include one or more docking bays configured on the base, where each docking bay is configured to position a smart device. The apparatus can further include a control means configured to control use of one or more of the speaker, the microphone, and the smart device based on the participant speaking at the video conferencing.

In another embodiment, a method provides for establishing connectivity between a first smart device of a user and a second smart device based on vicinity between the first and second smart devices. Such a connection can be established through a physical connection, or through hardware coupling between smart devices by use of a housing or docking bays, or through a wireless connection between the devices. Second smart device can be selected from a number of smart devices that are in vicinity of the user's first smart device. The method further provides for designating a relationship identifier to the connection established between the first smart device and the second smart device, where the relationship identifier can include a master-master relationship, a master-slave relationship, or a stand-alone relationship. The method further provides for enabling one or more of data transfer, session migration, sequential processing, and parallel processing between said first smart device and said second smart device based on the relationship identifier.

Other features of embodiments of the present disclosure will be apparent from accompanying drawings and from detailed description that follows.

BRIEF DESCRIPTION OF THE DRAWINGS

In the Figures, similar components and/or features may have the same reference label. Further, various components of the same type may be distinguished by following the reference label with a second label that distinguishes among the similar components. If only the first reference label is used in the specification, the description is applicable to any one of the similar components having the same first reference label irrespective of the second reference label.

DETAILED DESCRIPTION

Figure 1:
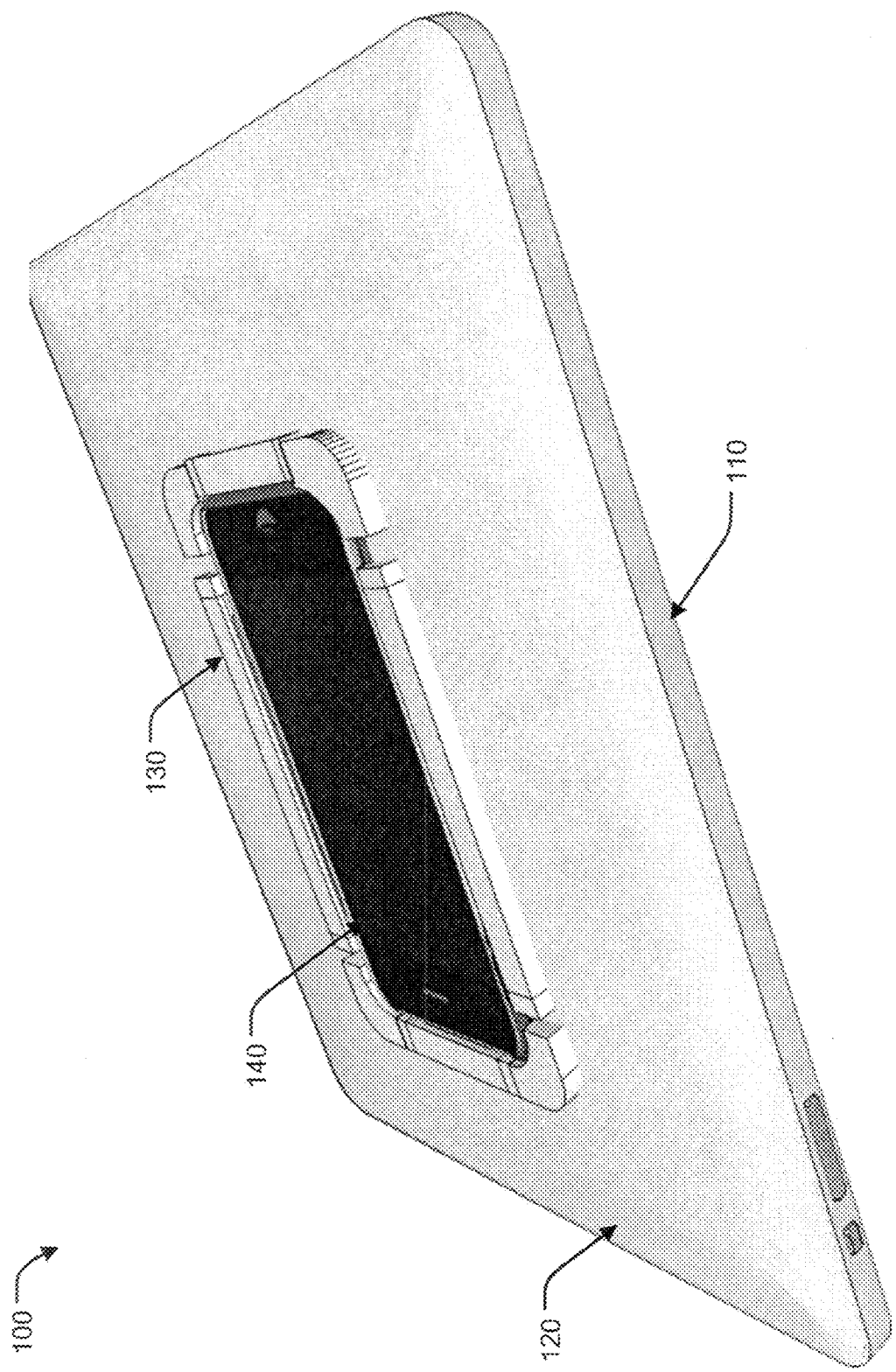
FIG. 1 illustrates a first smart device with a housing to receive various sized second smart devices in accordance with an aspect of the present disclosure.

Embodiments of the present disclosure generally relate to methods, systems, and apparatus for integrating smart devices to enable enhanced performance of existing applications/function and creation of new applications for improved user experience.

In the following description, numerous specific details are set forth in order to provide a thorough understanding of embodiments of the present disclosure. It will be apparent to one skilled in the art that embodiments of the present disclosure may be practiced without some of these specific details.

Embodiments of the present disclosure include various steps, which will be described below. The steps may be performed by hardware components or may be embodied in machine-executable instructions, which may be used to cause a general-purpose or special-purpose processor programmed with the instructions to perform the steps. Alternatively, steps may be performed by a combination of hardware, software, firmware and/or by human operators.

Embodiments of the present disclosure may be provided as a computer program product, which may include a machine-readable storage medium tangibly embodying thereon instructions, which may be used to program a computer (or other electronic devices) to perform a process. The machine-readable medium may include, but is not limited to, fixed (hard) drives, magnetic tape, downloads from server, floppy diskettes, optical disks, compact disc read-only memories (CD-ROMs), and magneto-optical disks, semiconductor memories, such as ROMs, PROMs, random access memories (RAMs), programmable read-only memories (PROMs), erasable PROMs (EPROMs), electrically erasable PROMs (EEPROMs), flash memory, magnetic or optical cards, or other type of media/machine-readable medium suitable for storing electronic instructions (e.g., computer programming code, such as software or firmware).

Various methods described herein may be practiced by combining one or more machine-readable storage media containing the code according to the present disclosure with appropriate standard computer hardware to execute the code contained therein. An apparatus for practicing various embodiments of the present disclosure may involve one or more computers (or one or more processors within a single computer) and storage systems containing or having network access to computer program(s) coded in accordance with various methods described herein, and the method steps of the disclosure could be accomplished by modules, routines, subroutines, or subparts of a computer program product.

If the specification states a component or feature "may", "can", "could", or "might" be included or have a characteristic, that particular component or feature is not required to be included or have the characteristic.

Although the present disclosure has been described with the purpose of coupling, combining or configuring two or more computing devices together integrally to allow operation between the two. The computing devices may be traditional laptops, desktops, smart phones, tablet PC's, and/or a combination therefore, among other such devices together. It should also be noted that computing devices and smart devices are used interchangeably and thus cover the same types of devices, as referenced below. It should be appreciated that the same has been done merely to illustrate the present disclosure in an exemplary manner and any other purpose or function for which the explained structure or configuration can be used, is covered within the scope of the present disclosure.

Embodiments of present disclosure and their advantages are best understood by reference to FIG. 1. FIG. 1 is an exemplary embodiment of the present disclosure showing a smart device having a housing to couple to another smart device. The smart device is termed as a computing device and can be a desktop device, a laptop device, a smart-phone mobile device, a tablet PC, a hand-held pad, an interactive display boards a smart camera, a surface computer, a television and the like.

FIG. 1 discloses the smart device 100, such as a tablet PC device, that is configured to couple and communicate with another smart device 140, such as a smart phone, in an aspect. Even though the embodiments of the present disclosure have been described by means of having the first smart device as a tablet PC and the second smart device as a smart-phone, it should be appreciated that this configuration is merely for illustration purposes and does not limit the scope of the present disclosure in any manner. Any other possible configuration can be provided to enable the implementation of the present disclosure such as a smart camera can be fitted into a housing of the tablet PC or a smart-phone can be fitted into an interactive display board.

The smart device 100 comprises one or more processors (not shown) for processing instructions. The first smart device 100 includes one or more communication interface devices or ports for accessing other devices for receiving and transmitting data to and from other electronic devices. The first smart device 100 includes one or more internal data storage devices, wherein the storage devices are operatively coupled to the processor(s) for storing data.

The first smart device 100 can include a front side 110 having a touch-based display configured to operate and perform functions based on touch and a rear side 120 present on the opposite end of the front side 110. Further, the smart device 100 can include a receiving dock housing 130, also interchangeably referred to as a slot, dock or a docking basin hereinafter, formed on the rear side 120 and configured to receive another second smart device such as a smart-phone 140.

Smart-phone 140, interchangeably referred to second smart device 140 hereinafter, can include one or more processors, communication interface devices, and internal storage devices, operatively coupled to each other to perform desired functions. In an aspect, the smart device 100 itself is configured to include the slot or docking basin as an integral feature. In another aspect, the smart device 100 is coupled to a separate housing to which the smart device 100 is coupled, wherein the separate housing integrally configures the slot or docking basin 130.

According to one embodiment, the smart device 100 can be switched on and operated in normal mode, wherein the second smart device 140 can be placed in the dock 130 of the first smart device 100 and switched on for its normal and/or concurrent operation. Alternatively, the second smart device 140 can also be initially coupled with the first smart device 100, subsequent to which both the devices can be turned on for respective use. First smart device 100 is accordingly physically coupled to the second device 140 upon placing the device 140 in the housing 130. Such physical coupling between the first device 100 and the second device 140 can allow multiple objectives to be achieved, including but not limited to, charging of respective batteries of first and second smart devices from each other or based on a defined logic, transfer of data/content/applications/settings from one smart device to the other, sharing of storage space, processors, or ports of each others, among other such objectives.

It should be appreciated that even through the present disclosure illustrates the second smart device 140 to be configured on the rear side of the first smart device 100, any possible construction or structure can be designed on any side of the first smart device to physically incorporate the second smart device 140, and all such constructions or structure would be within the scope of the present disclosure.

According to one embodiment, housing 130, configured on rear side of first smart device 100, can include a plurality of edges or faces extending outwards from the rear side 120 of first smart device 100, therefore forming a pit or basin like structure to receive the second smart device 140. The second device 140 can be placed and locked into the housing 130 so as to prevent the second smart device 140 from falling or slipping. In an alternate embodiment, the housing 130 can be formed within the first smart device 100, resulting in a pit without any outward protrusion from the rear side 120, thereby forming a substantially flat surface on rear side 120 of the first smart device 100 upon placement of the second smart device 140 in the housing 130.

According to one embodiment, one or both of the first smart device 100 and the second smart device 140 can be operated and/or charged by an electrical power source by one or more internal batteries, one or more external batteries and/or a separate AC and/or DC power source. Alternatively, once physically coupled, first smart device 100 can be configured to operate and/or charge the second smart device 140 and vice versa depending on the logic implemented for charging. For instance, in an embodiment, the smart device having a lower remaining battery can be configured to be charged by the device having relatively more battery via a batter or separate power source (wall, car charger).

Figure 2:
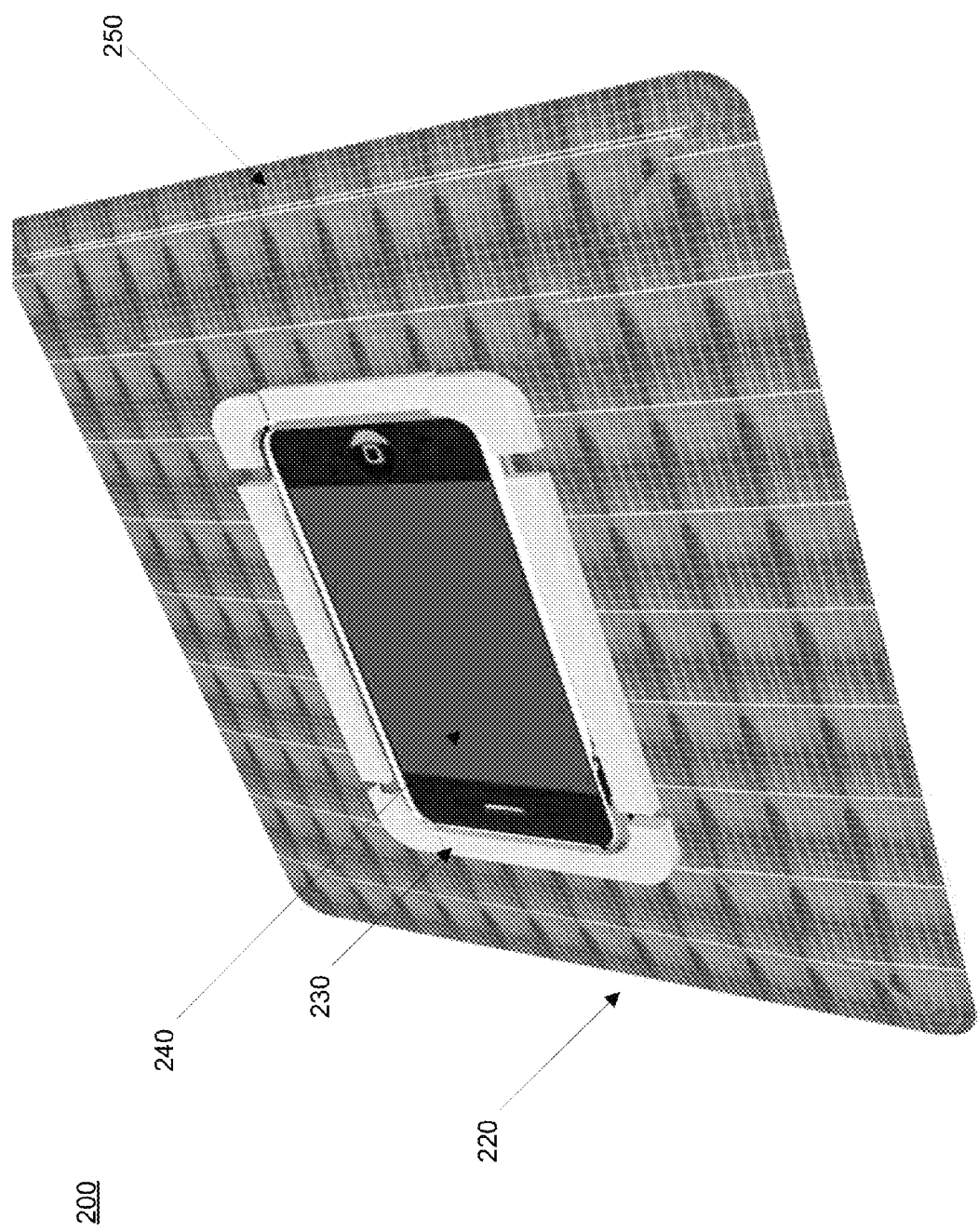
FIG. 2 illustrates a first smart device having a solar panel for charging and having a housing to receive various sized second smart devices in accordance with an aspect of the present disclosure.

According to another embodiment as shown in FIG. 2, the first smart device 200, for example a tablet PC, includes a rear side 220 having a dock housing 230 to receive a smart-phone (second smart device) 240, wherein the rear side 220 of the device incorporates a solar panel 250 such that the rear side 220 receives sunlight, which configures charging of the internal battery of the device 200 using solar energy. In another embodiment, when second smart device 240 is connected to the first device 200, via the housing 230, the second device 240 can also be charged through the electrical energy generated by the solar panel 250 present on the rear side 220 of the device 200.

Figure 3:
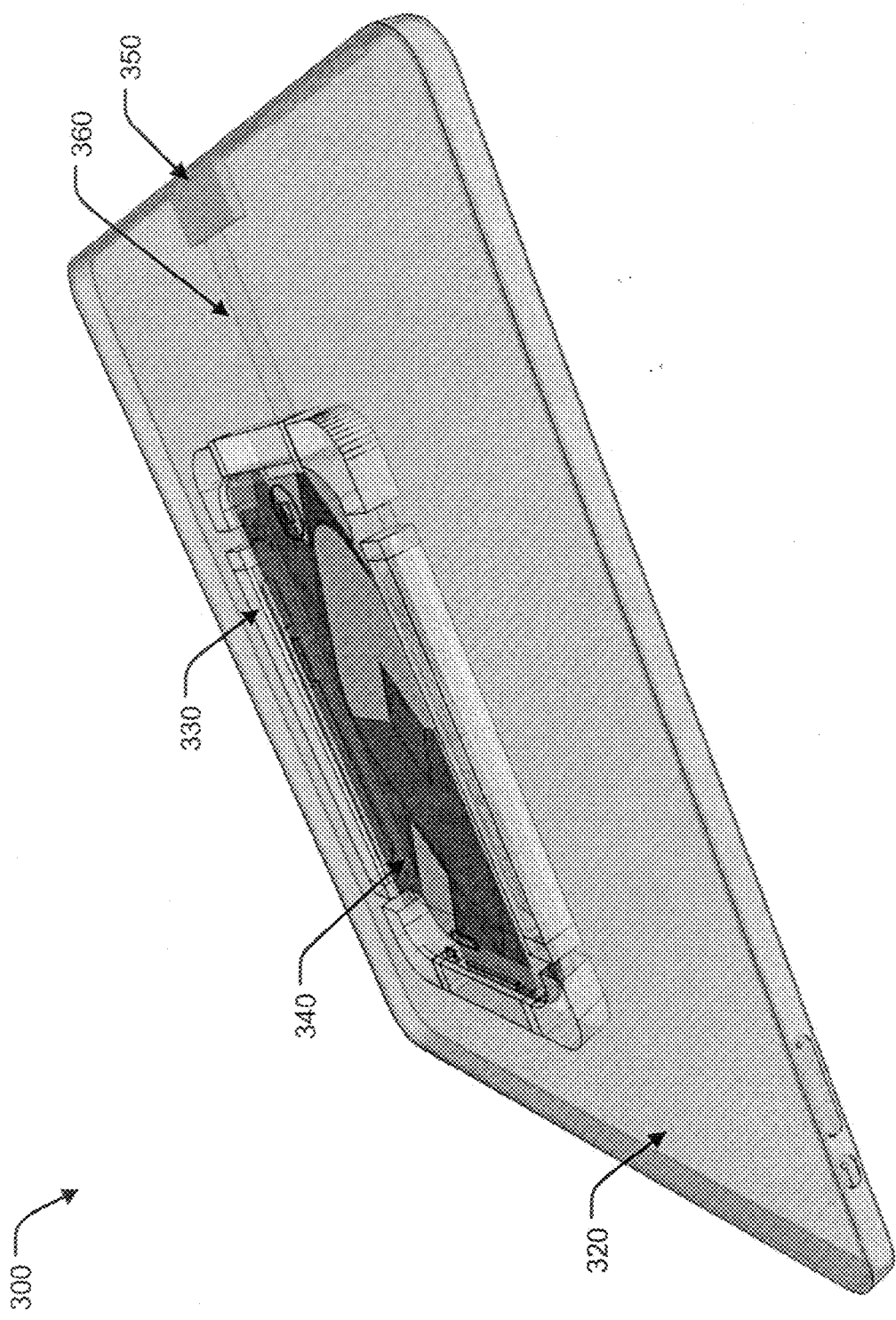
FIG. 3 illustrates an X-ray view of a first smart device comprising a housing to receive a second smart device in accordance with an aspect of the present disclosure.

FIG. 3 illustrates an X-ray or internal view of a first smart device 300 showing physical connection between the device 300 and the second smart device 340 when coupled to in dock housing 330 on rear side 320 of the first smart device 300. Device 300 includes a connector 350 on one end which is extended through a flexible film cabling 360 within rear side of the device 300 and extends from the connector 350 to the housing 330. Communication interface device such the charging port of the second smart device 340 can be operatively connected to the connector 350 of first smart device 300 through the cabling 360 so as to form a physical coupling between the first and second smart devices for one or more of charging the battery and/or operating the devices themselves, data transfer, transfer of sessions, execution of applications, and transfer of settings, use of network and WiFi antennas and other such functionalities. It should be appreciated that the physical connection mechanism as disclosed herein is only one exemplary illustration and many other connector-cabling configurations can be implemented for enabling physical connection between the first smart device 300 and the second smart device 340.

Figure 4:
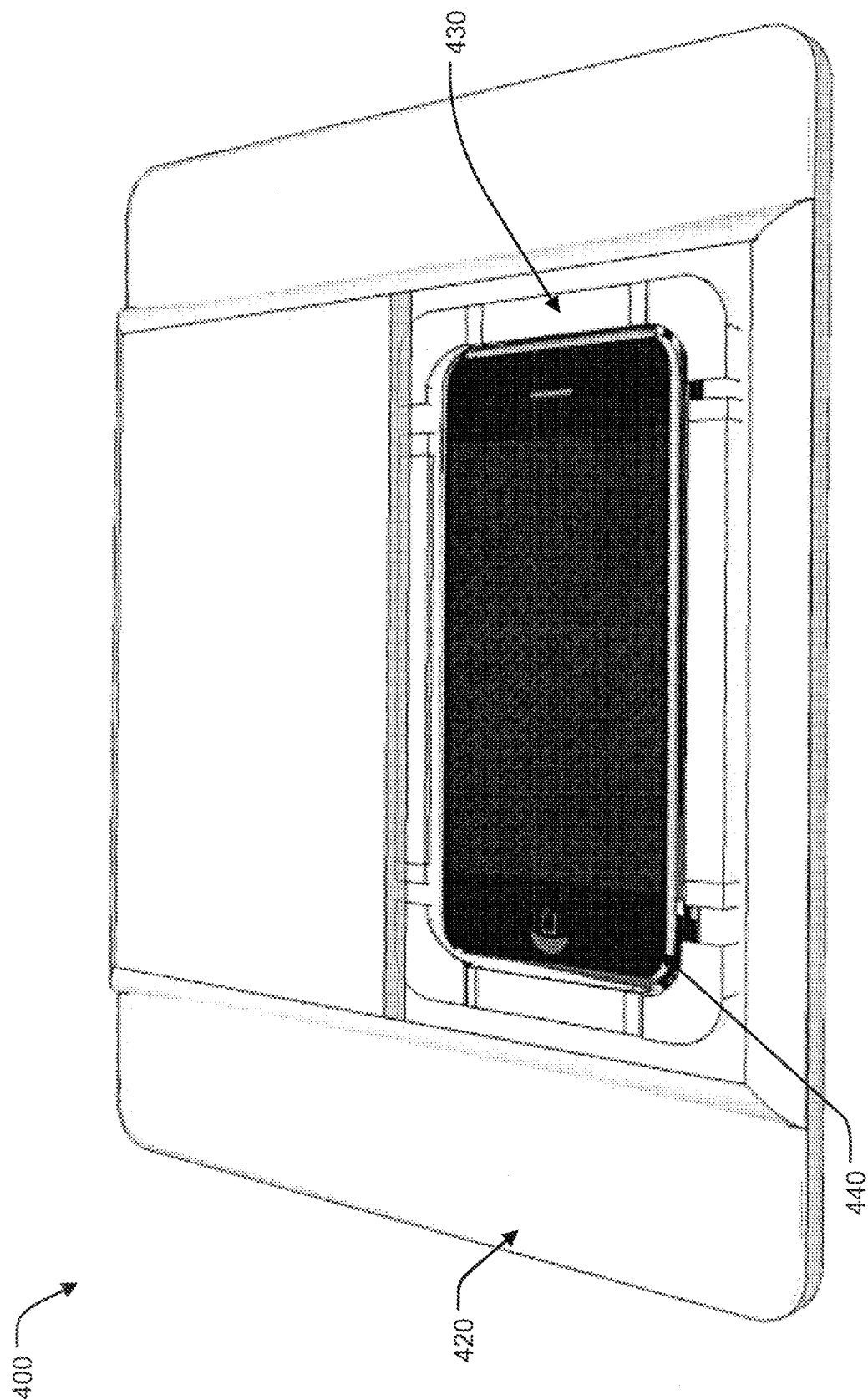
FIG. 4 illustrates a first smart device with a housing near one end of its rear side to receive a second smart device in accordance with an aspect of the present disclosure.

According to one embodiment, housing 330 of FIG. 3, as shown, can be positioned at substantially the center of the rear side 320 of the first smart device 300. FIG. 4, on the other hand, illustrates another embodiment showing a rear side 420 of first smart device 400 comprising a housing 430, wherein the housing 430 can be present near one end of the rear side 420. Housing 430 can be situated near any end of the rear side 420 of the first smart device and can be configured to receive the second smart device 440, thereby enabling formation of a physical connection between the first smart device 400 and the second smart device 440.

Figure 5:
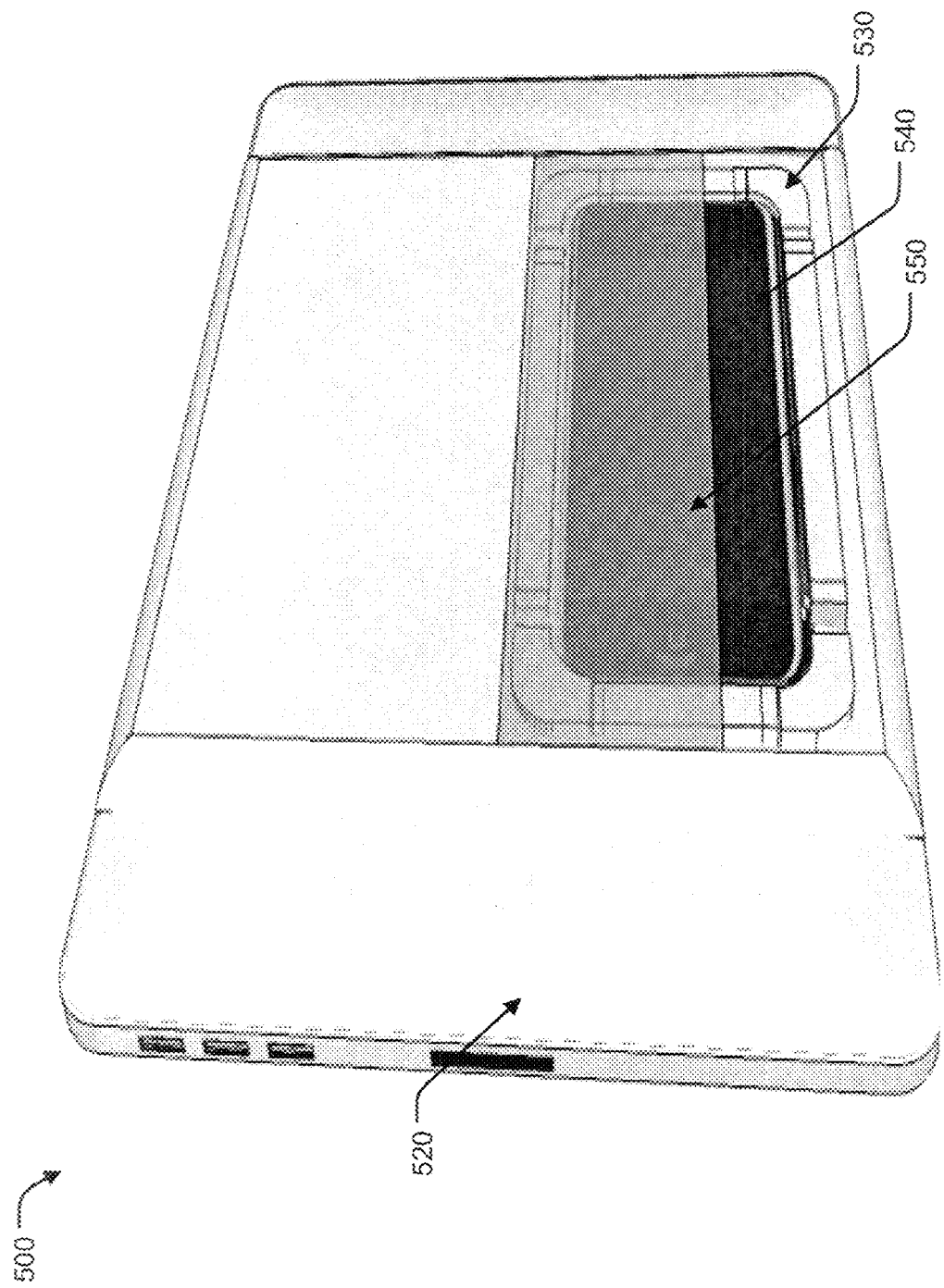
FIG. 5 illustrates a first smart device with a housing near one end of its rear side to receive a second smart device in accordance with an aspect of the present disclosure.

FIG. 5 illustrates another embodiment showing a first smart device 500 comprising a housing 530 with adjustable dimensions, wherein dimensions of the housing 530 can be adjusted in such a way such that a second smart device 540 of any size can be configured or positioned within the housing 530 for physical coupling with the first smart device 500. Housing 530 can be made of adjustable dimensions through one or more of a slider, a button, a push mechanism, stretchable material, and a screw-nut mechanism, among other such mechanisms for allowing easy change or adjustment in the dimensions of the housing 530, which in turn allows multiple types or makes of second smart devices 540 to be coupled to, and thus used with, the first smart device 500. In another embodiment, housing 530 can be partially or fully covered with a thin protective sheet 550 of material such as plastic, resin, transparent glass, and the like for protecting the second smart device 540 positioned therein. The protective sheet 550 can be removed, slid or lifted from any of the ends in a desired manner to couple or decouple the sheet 550 from the housing 530.

Figure 6:
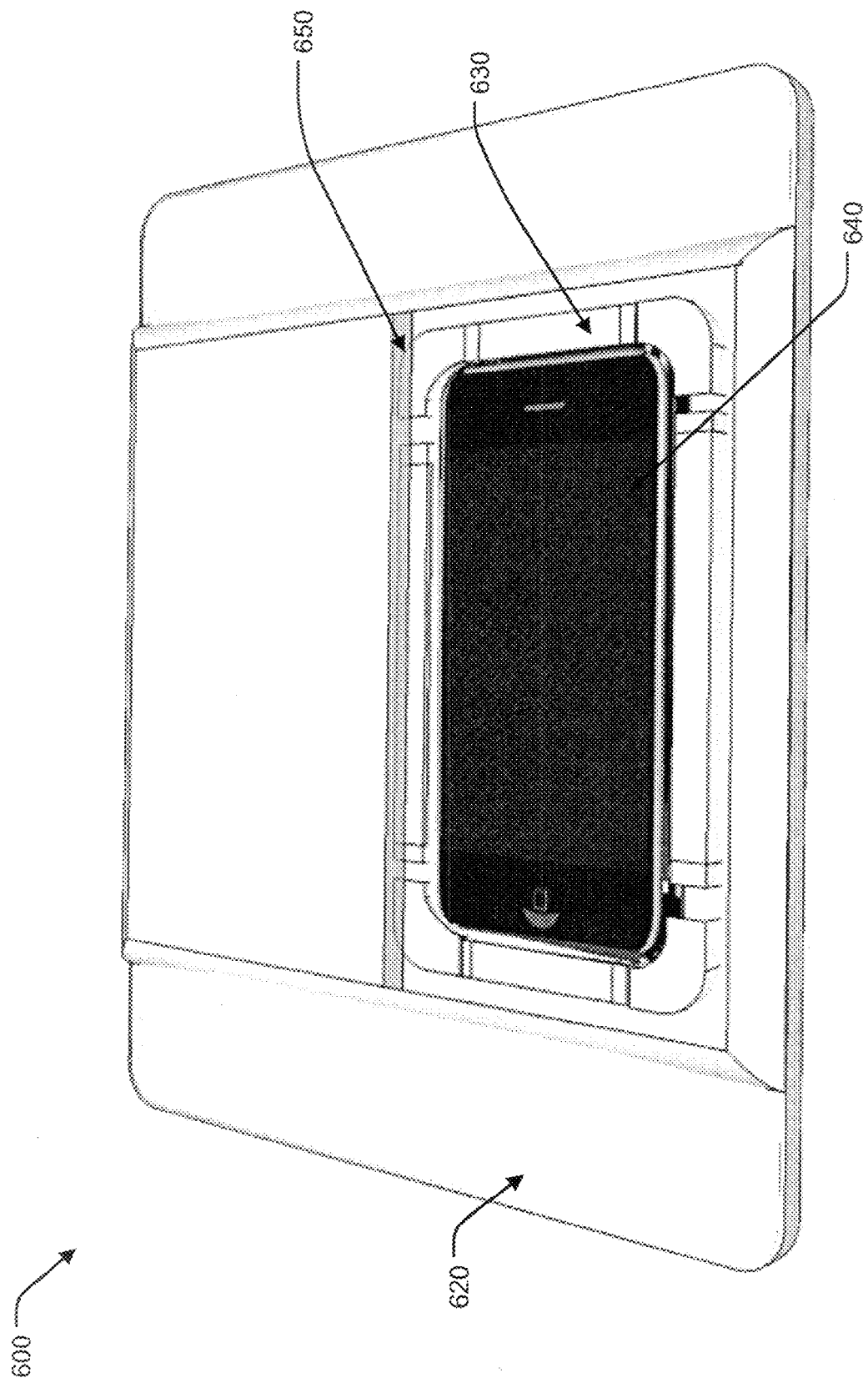
FIG. 6 illustrates a first smart device with a housing comprising a glass slider to open/close to expand/contract the housing in accordance with an aspect of the present disclosure.

FIG. 6 illustrates a first smart device 600 comprising a slider protective sheet 650 slideable with respect to the rear side 620 of the first smart device 600 to expose housing 630. Sliding of the protective sheet 650 inward or outward can allow placement or removal of second smart device 640 into or from the housing 630.

Figure 7:
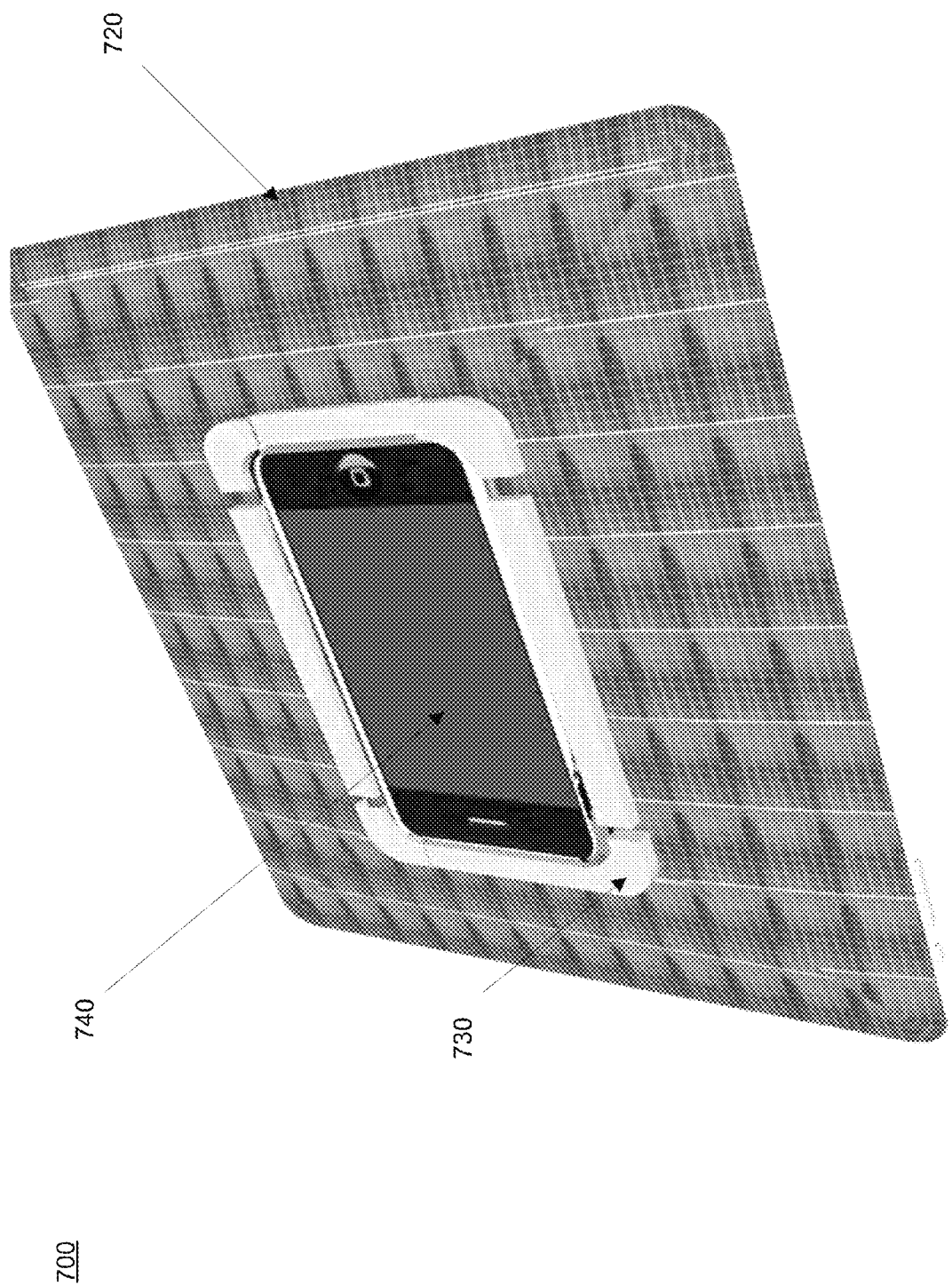
FIG. 7 illustrates a first smart device with a second smart device placed in its housing and having its front side facing outward in accordance with an aspect of the present disclosure.

FIG. 7 illustrates a first smart device 700 comprising a solar panel on rear side 720 of the device 700 and further comprising a housing 730 to receive a second smart device 740 such as a smart-phone, wherein the touch-screen of the smart phone 740, which is configured on the front side of the smart phone 740, is positioned facing outwards from the housing 730. This allows the user to access the first smart device 700, such as tablet PC, from front side and use the second smart device 740 upon turning to the rear side 720. Conversely, user interface of the second smart device 740 can also be accessed from the first smart device 700. It should be appreciated that incorporation of the solar panel is only an exemplary illustration, and the second smart device can easily be configured with in the first smart device without the solar panel.

Figure 11:
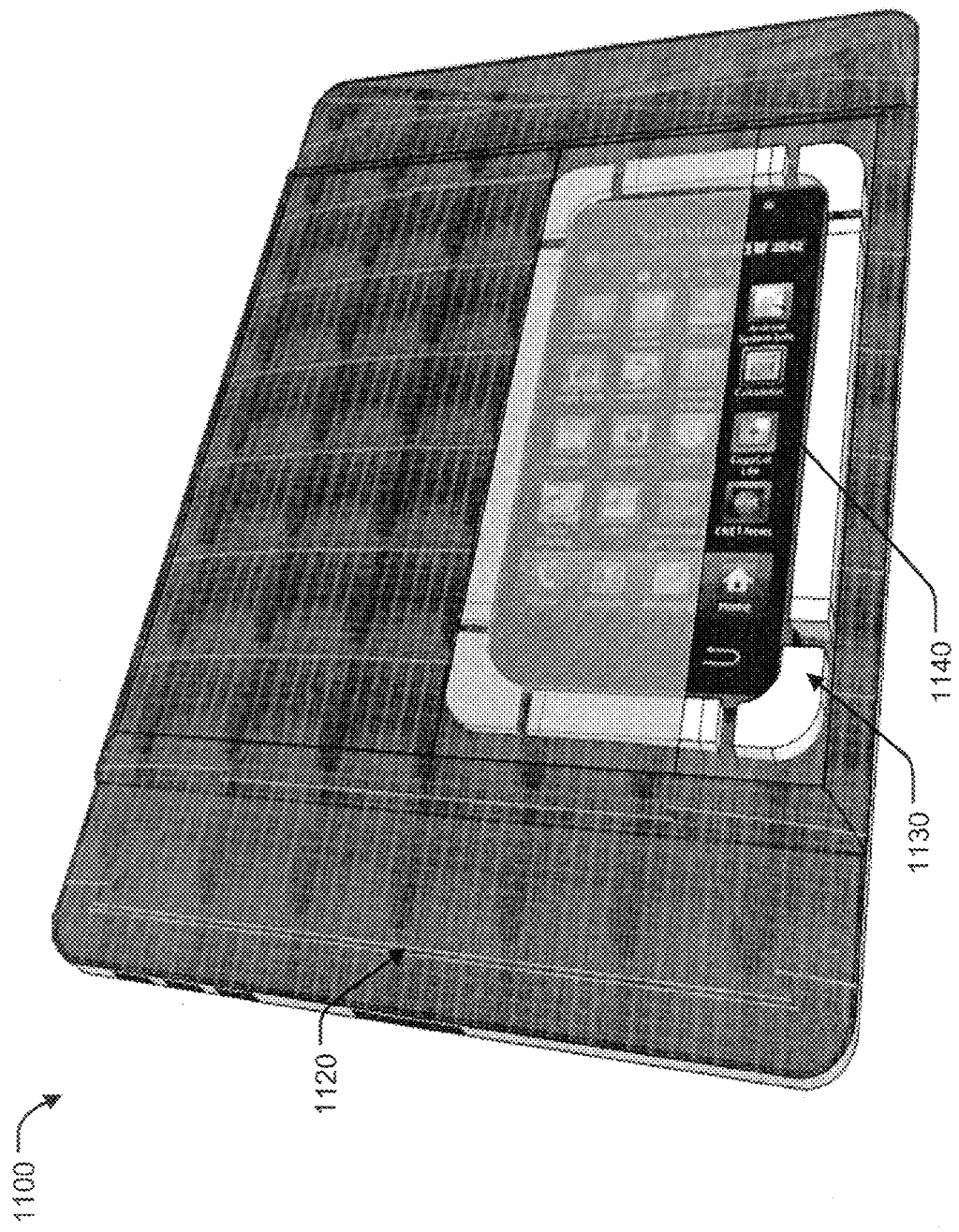
FIG. 11 illustrates first smart device housing with adjustable dimensions receiving another type of second smart device in accordance with an aspect of the present disclosure.

FIG. 11 illustrates another embodiment showing another type of second smart device 1140 with different dimensions being configured in adjustable housing 1130 placed on rear side 1120 of first smart device 1100, wherein the touchscreen of the second smart device 1140 faces outwards for user access.

Figure 8:
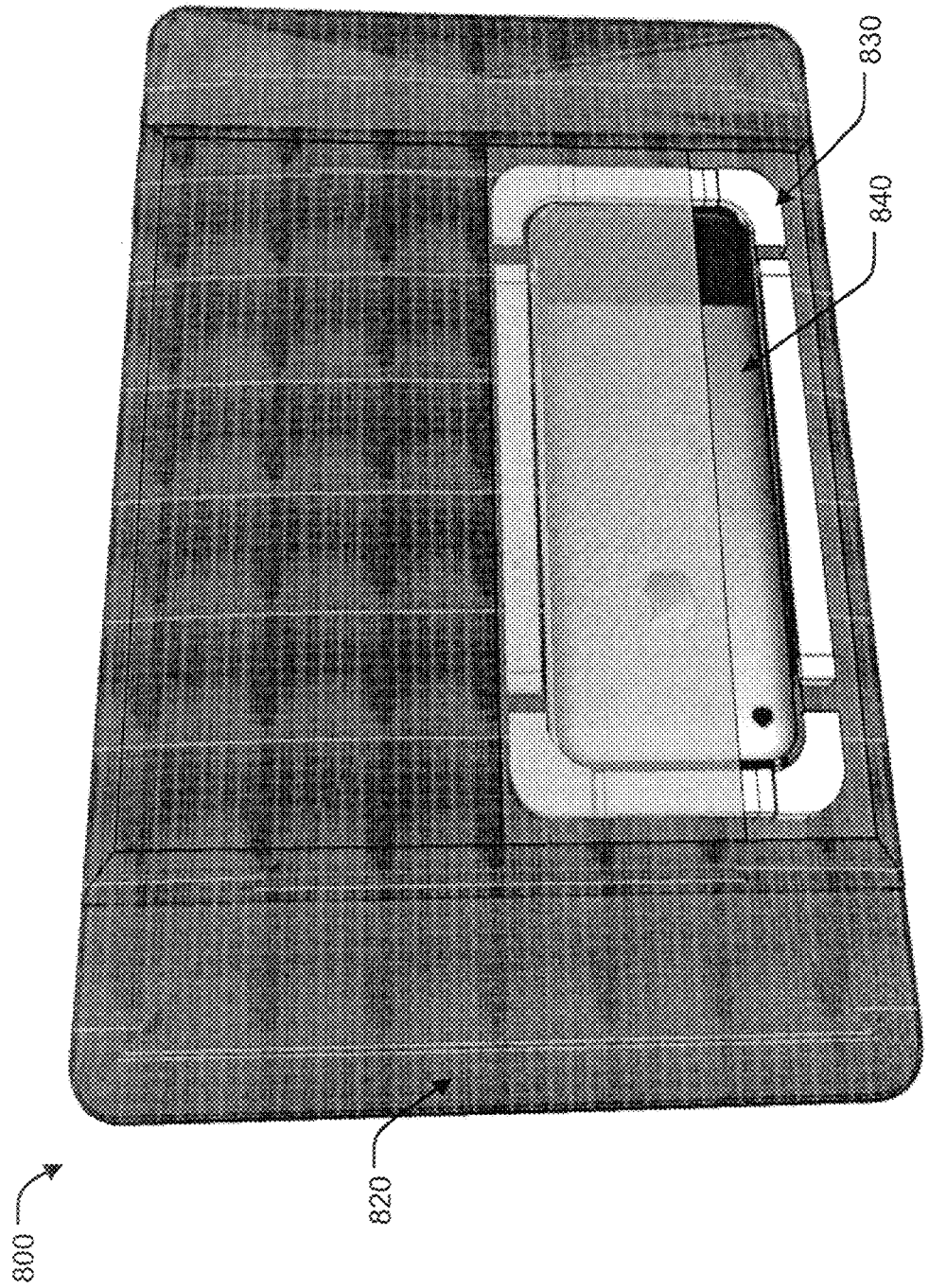
FIG. 8 illustrates a first smart device with a second smart device placed in its housing and having its rear side facing outward in accordance with an aspect of the present disclosure.
Figure 12:
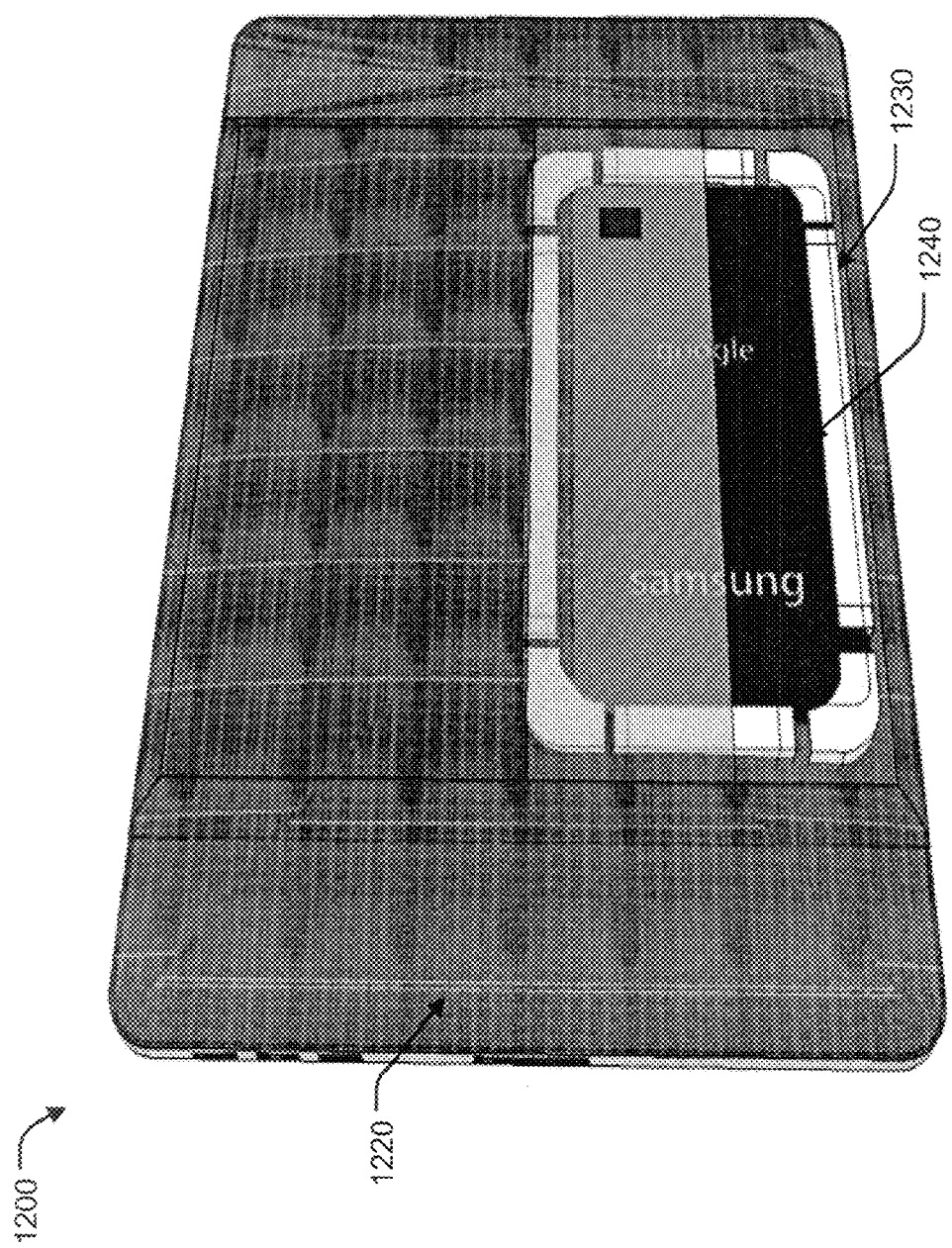
FIG. 12 illustrates first smart device housing with adjustable dimensions receiving another type of second smart device in accordance with an aspect of the present disclosure.

FIG. 8 illustrates a first smart device 800 comprising a solar panel configured on a rear side 820 of the first smart device 800. The first smart device 800 further includes a housing 830 configured to receive a second smart device 840, wherein the rear side of the second smart device 840 is positioned outwards from the housing 830. Accordingly, the touch screen of the second smart device 840 is not exposed when coupled to the first smart device 800. FIG. 12 illustrates another embodiment showing other type of second smart device 1240 with different dimensions being configured in adjustable housing 1230 placed on rear side 1220 of first smart device 1200, wherein rear side of the second smart device 1240 faces outwards.

Figure 9:
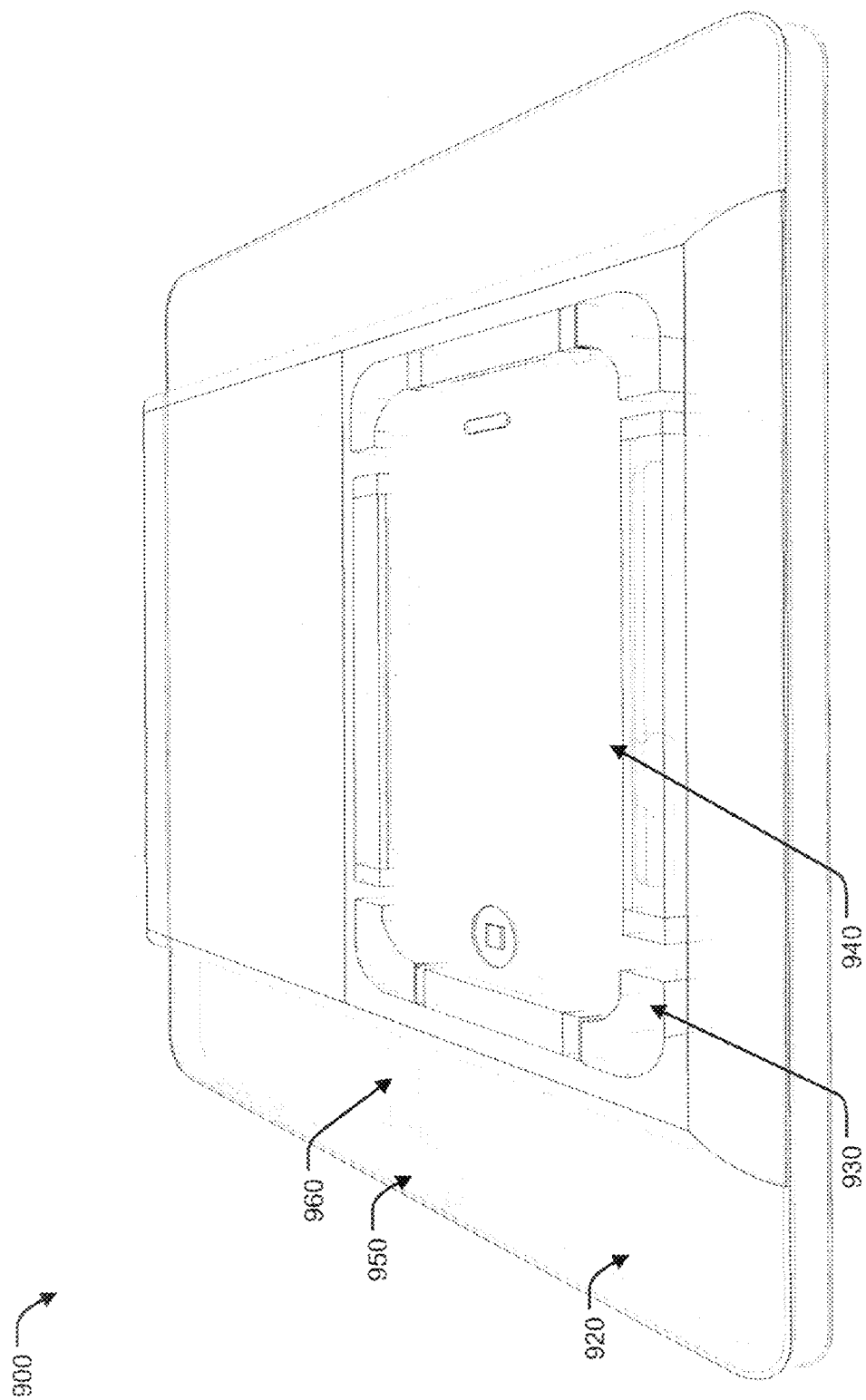
FIG. 9 illustrates a line drawing of a first smart device showing assembly and connections in accordance with an aspect of the present disclosure.

FIG. 9 illustrates line diagram of a first smart device 900 showing rear side 920, housing 930, second smart device such as smart-phone 940, connector 950, and flexible film cabling 960. Line diagram of the first smart device such as tablet PC 900 clearly shows the assemblies and connections forming direct physical coupling between the first smart device 900 and the second smart device 940.

Figure 10:
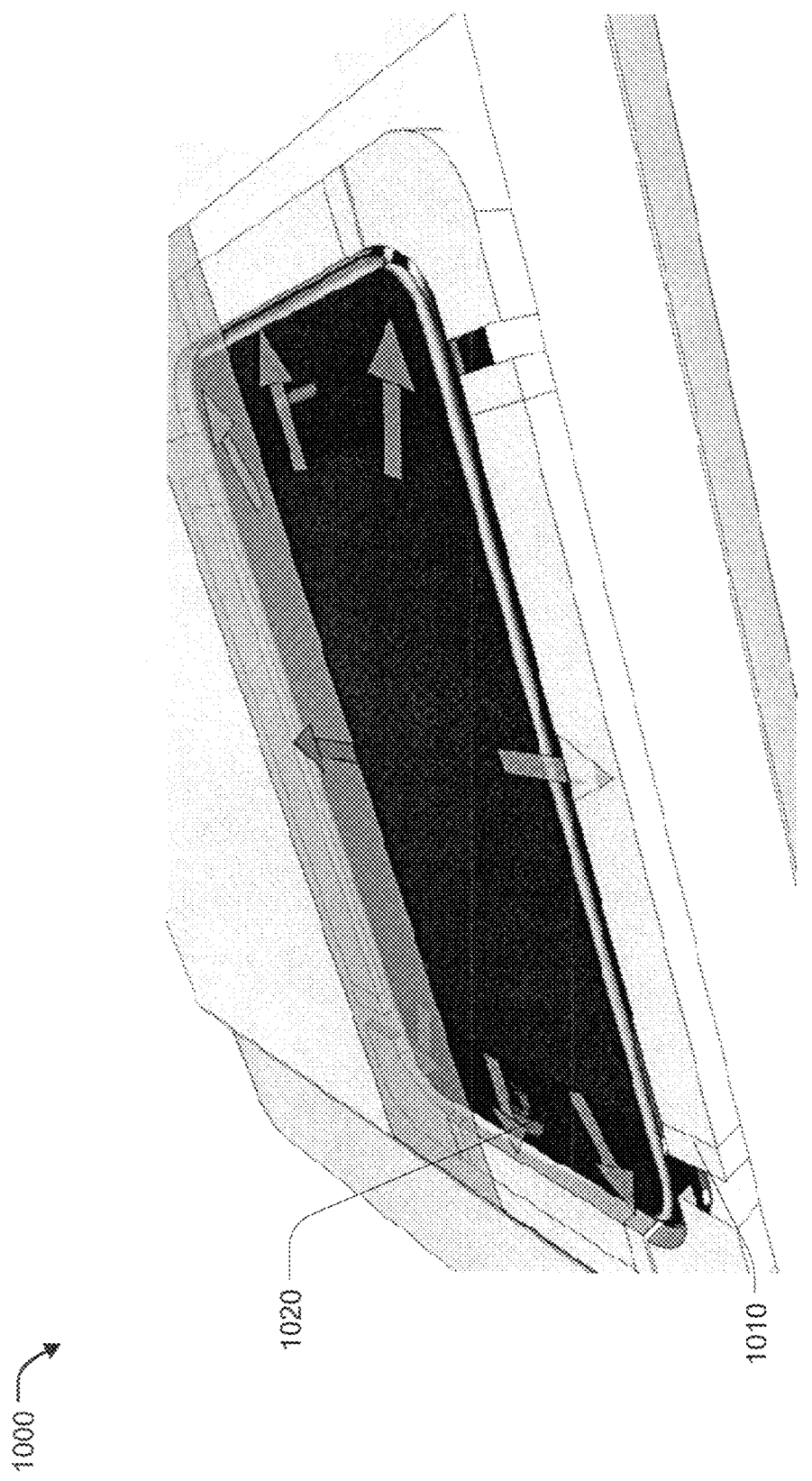
FIG. 10 illustrates a housing in a first smart device that is configured to hold or position a second smart device in accordance with an aspect of the present disclosure.

FIG. 10 illustrates a housing 1010 in a first smart device that is configured to hold or position a second smart device 1020. As shown, the housing 1010 can be made of adjustable dimensions through one or more of a slider, a button, a push mechanism, stretchable material, and a screw-nut mechanism, among other such mechanisms for allowing easy change or adjustment in the dimensions of the housing 1010, which in turn allows multiple types or makes of second smart devices 1020 to be configurable in the first smart device. As shown, each edge of the housing 1010 can be expanded or contracted in any desired direction to ensure compatibility with all types of smart devices 1020. As would be appreciated, the housing 1010 can be made of any desired material or design such that it strongly and securely couples with the second smart device 1020 and allows easy insertion or removal of the device 1020.

Figure 13:
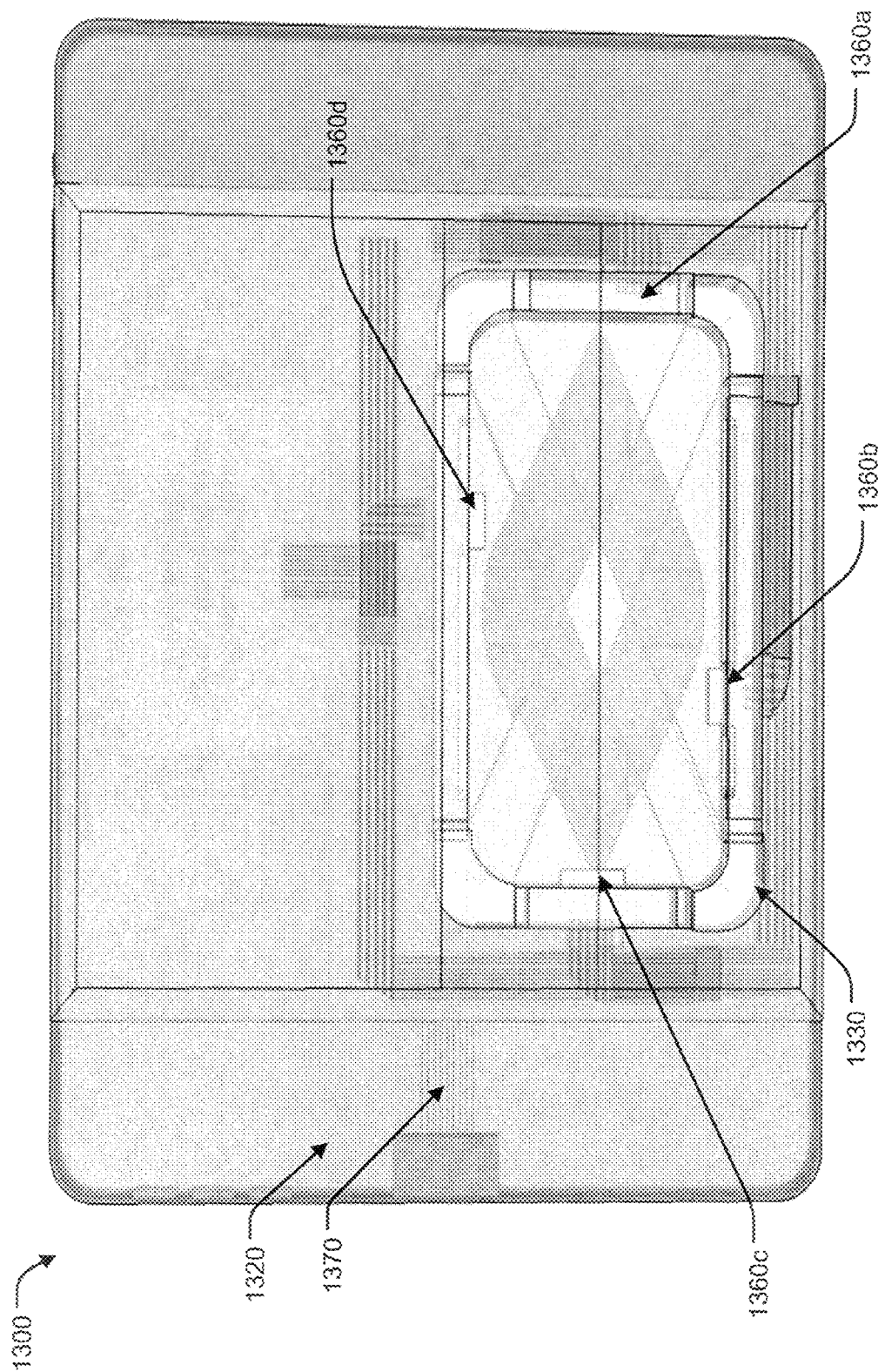
FIG. 13 illustrates an X-Ray view of a first smart device showing connectors and mode of connection with second smart device in accordance with an aspect of the present disclosure.

According to one embodiment, first smart device can include a connector positioned at one end to enable formation of a connection with a second smart device. FIG. 13 illustrates another embodiment of a first smart device 1300 having four connectors 1360a, 1360b, 1360c and 1360d located on four sides of housing 1330, wherein the housing 1330 is configured on the rear side of the first smart device 1300. Connectors 1360a, 1360b, 1360c and 1360d can be configured to provide better reliability to user for connecting various kinds of second smart devices with communication interface devices located at any particular position on their bodies. Connectors 1360a, 1360b, 1360c and 1360d can be connected by a logic controller (not shown), wherein the logic controller identifies communication interface device at a particular connector and creates a connection between the respective connector that receives connection with communication interface port of the second smart device and deactivates other connectors, thereby saving power.

For instance: a smart phone can be positioned in the housing 1330, wherein the smart phone has a communication interface device facing opposite to the connector 1360a. Upon receiving and detection of the second smart device, logic controller of the first smart device 1300 can be configured to activate logic communication line (not shown) of 1360a and deactivate other communication lines of connectors 1360b, 1360c and 1360d.

In another embodiment, connectors 1360b and 1360d, which are present on two opposite sides, are provided with a feature of sliding such that the connectors can be moved to any particular location to suit the requirement of connection with a communication interface device of the second smart device. First smart device 1300 can also be provided with a power management system in association with the logic controller so as to manage the power being supplied to the connectors upon detecting and receiving a connection and deactivating power supply to other connectors at which the connection is not detected.

In another embodiment, housing 1330 of the first smart device 1300 can be moved from the centre portion of the rear side 1320 to one end of the rear side 1320 or vice versa. Flexible film cabling 1370 that connects communication interface device of the second smart device to the connector 1360 can be positioned in such a way that connection can be configured between the first smart device 1300 and the second smart device, wherein the second smart device can be received in the housing 1330.

Figure 14:
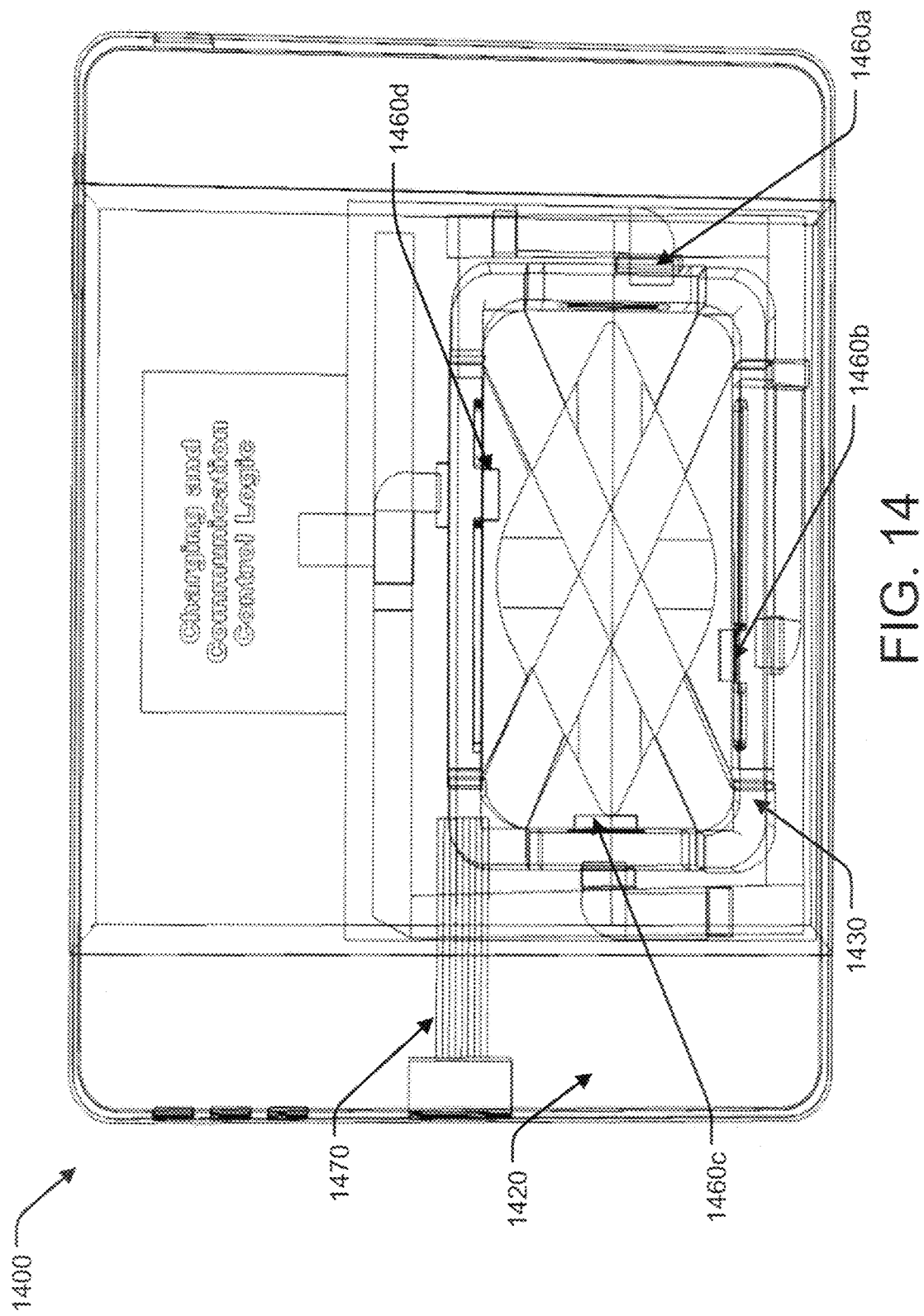
FIG. 14 illustrates an X-Ray view of a first smart device showing connectors and mode of connection with second smart device in accordance with an aspect of the present disclosure.

FIG. 14 illustrates a line drawing of the FIG. 13 showing connections and assemblies of units of the first smart device 1400 including connectors 1460, housing 1430, cabling 1470, and rear side 1420, as described in FIG. 13.

Figure 15:
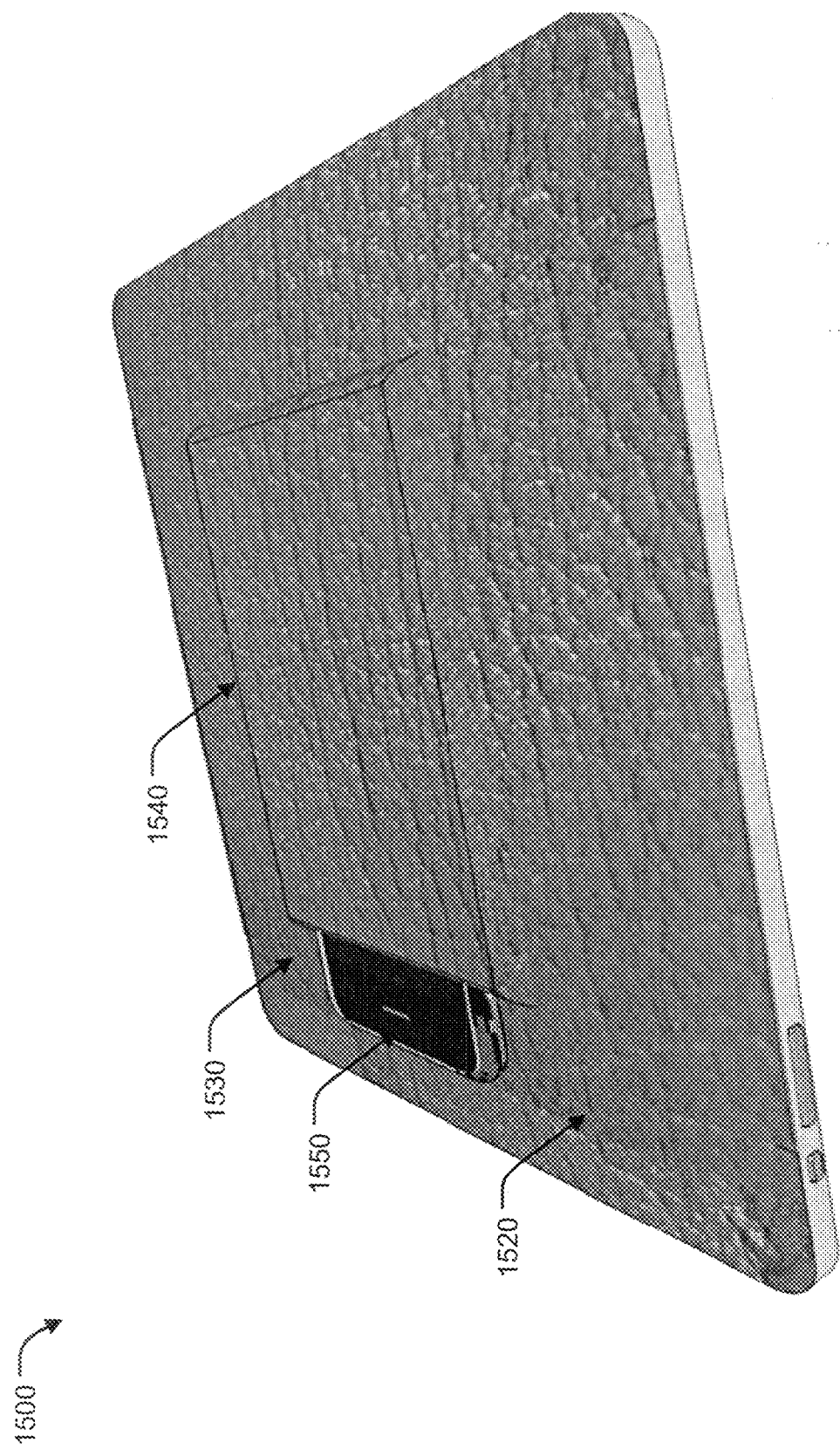
FIG. 15 illustrates a first smart device with tablet sleeve forming a housing to receive a second smart device in accordance with an aspect of the present disclosure.

FIG. 15 illustrates a first smart device 1500 having a side 1520 that is covered with a tablet sleeve 1530. Sleeve 1530 provides ease in handling the first smart device such as a device 1500 and provides additional safety from breakage. According to an embodiment, the sleeve 1530 includes a housing 1540, also interchangeably referred to as a docking bay or a slot 1540, configured to receive a second smart device 1550. In an implementation, the second smart device 1550 can be slid into the housing 1540 such that the housing enables a physical coupling to be created between the second smart device 1550 and first smart device 1500. Sleeve 1530 can be made of material such as, but not limited to, leather, velvet, resin or other polymeric material, rubber, glass, or other like material. Sleeve 1530 can be configured with the first smart device 1500 through one or more of zipper, clasps, elastic material, Velcro, soft-lips, laminations, and such other mechanisms.

According to one embodiment, even through the present embodiments are being disclosed with reference to sleeves such tablet or smart-phone sleeves, it would appreciated that any other suitable cover or case for smart devices of similar form-factor can be used for incorporating a housing therein to allow positioning of a second smart device and enable physical coupling of the first and second smart devices. Furthermore, even though FIG. 1-15 are shown with respect to housing within the first smart device, it would be appreciated that the housing can be well made in a customized sleeve, skin, case, or cover of the first smart device so that all embodiments as disclosed above are maintained and applicable. Such sleeves can act as back support of the smart device and can appear exactly same as the rear side of the smart device.

Figure 16:
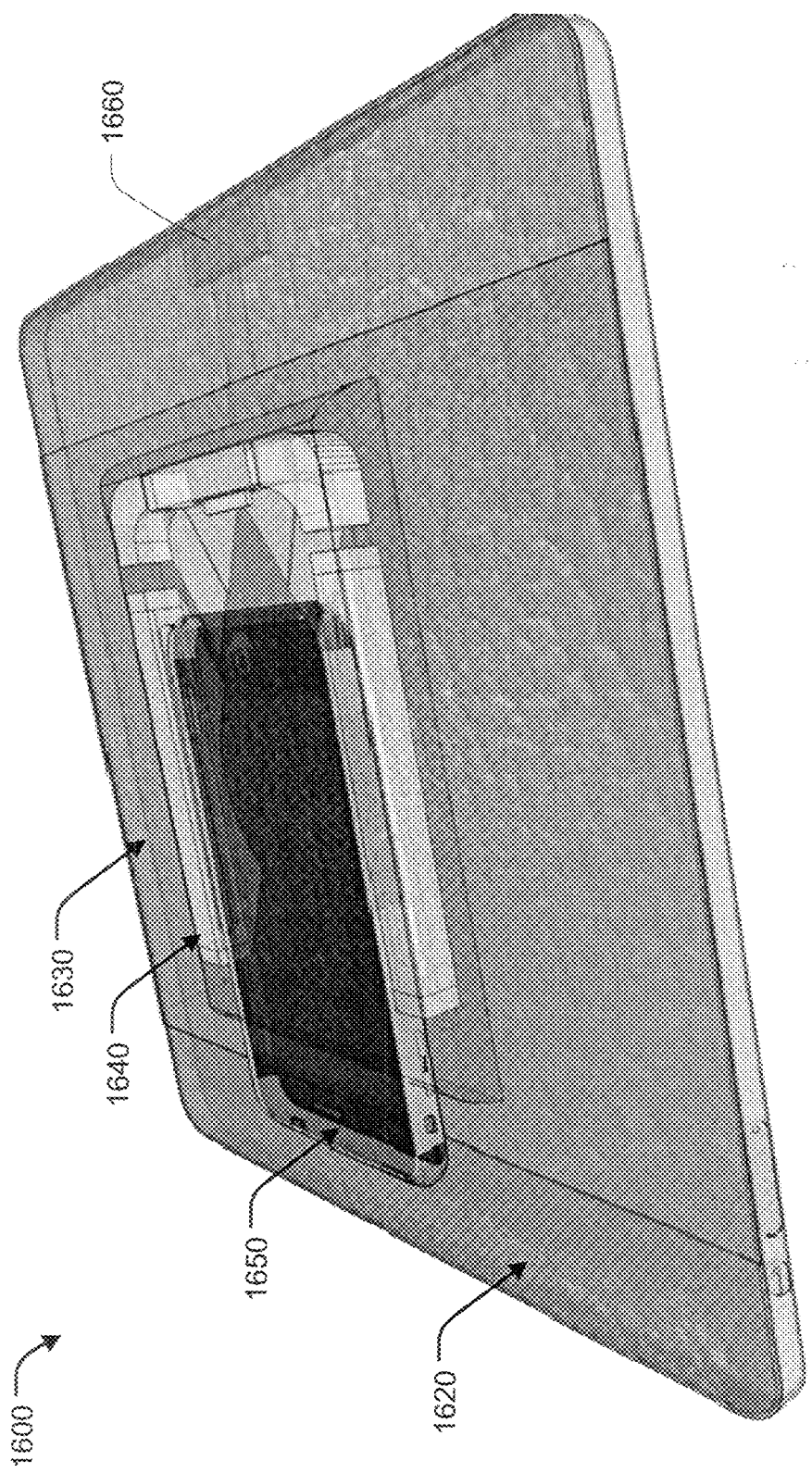
FIG. 16 illustrates an X-Ray view of a smart device comprising a tablet sleeve forming a housing to receive second smart device in accordance with an aspect of the present disclosure.

FIG. 16 illustrates an X-Ray view of first smart device 1600 showing a sleeve 1630 formed on one side 1620 of the first device 1600, wherein the sleeve comprises a housing 1640 to receive a second smart device 1650. Communication interface device (not shown) of the second smart device 1650 forms connection with connector 1660 of the first smart device 1600 for charging, data transfer, transfer of sessions, and transfer of settings, and like operations.

Figure 17:
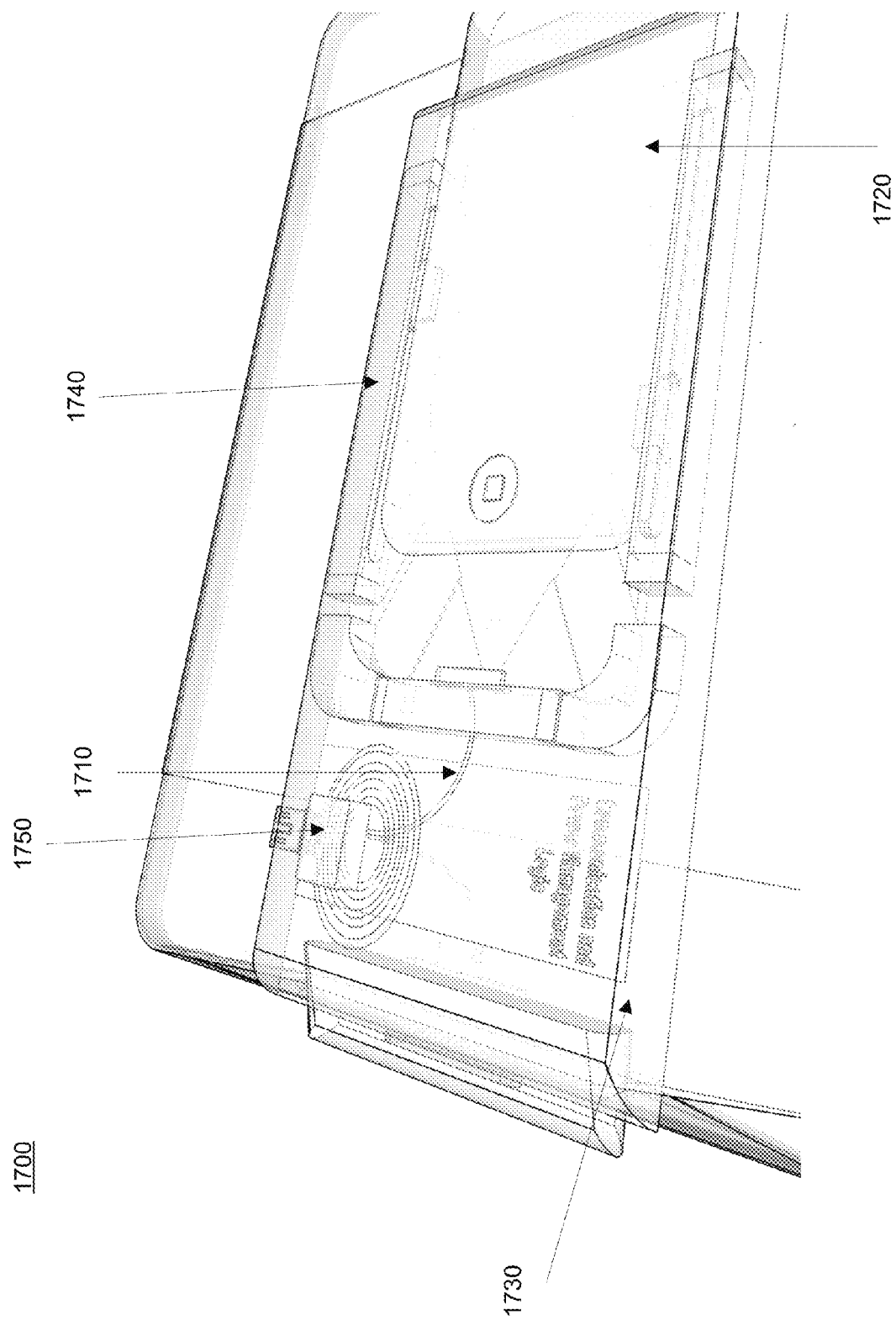
FIG. 17 illustrates a view of a smart device connected with a USB socket through USB cables in accordance with an aspect of the present disclosure.

FIG. 17 illustrates another embodiment showing a first smart device 1700 that is operatively coupled with a USB socket 1750 through a USB cable 1710, wherein the socket 1750 is also operatively coupled with a second smart device 1700 through another USB cable such that the USB cables and socket 1750 are configured to form a connection between the first and second smart devices. USB cables 1710 can be a part of the communication interface devices that enable formation of a physical connection between the first smart device 1700 and the second smart device 1720. In another embodiment, USB cables 1710 can be present on exterior surface of sleeve 1730 of the first smart device 1700 so as to form an external connection between the first smart device 1700 and any other third smart device along with the second smart device 1720 placed in housing 1740.

Figure 18:
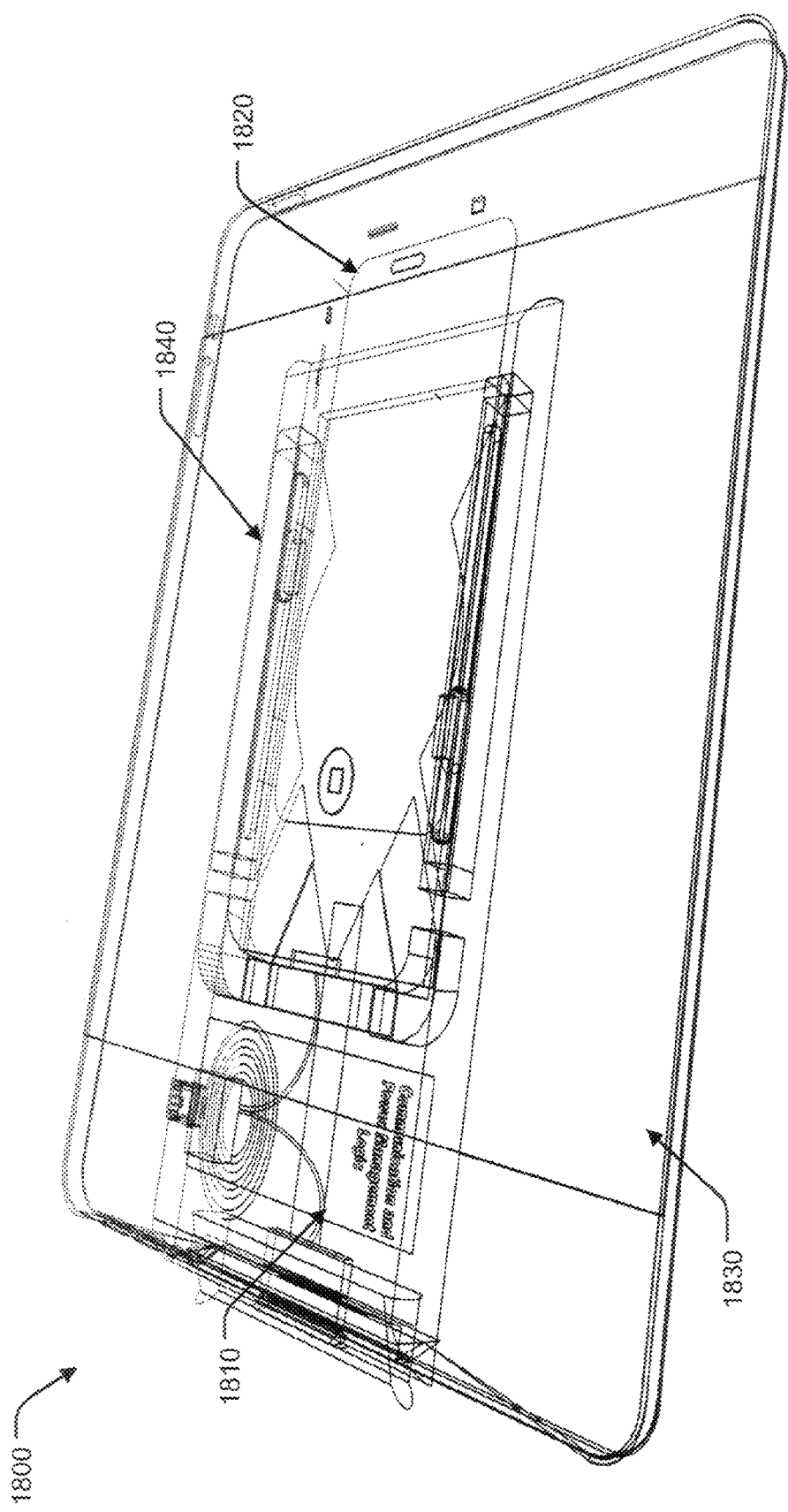
FIG. 18 illustrates a view of a smart device connected with a USB socket through USB cables in accordance with an aspect of the present disclosure.

FIG. 18 illustrates line drawing showing connections and assemblies for the first smart device 1800 connected to a USB socket through USB cables 1810, wherein cables 1810 of the socket are also connected to a second smart device 1820 that is configured in a housing 1840 of sleeve 1830, wherein the sleeve is affixed to the first smart device 1800 and the housing 1840 therein allows physical connection between the first smart device 1800 and the second smart device 1820.

Figure 19:
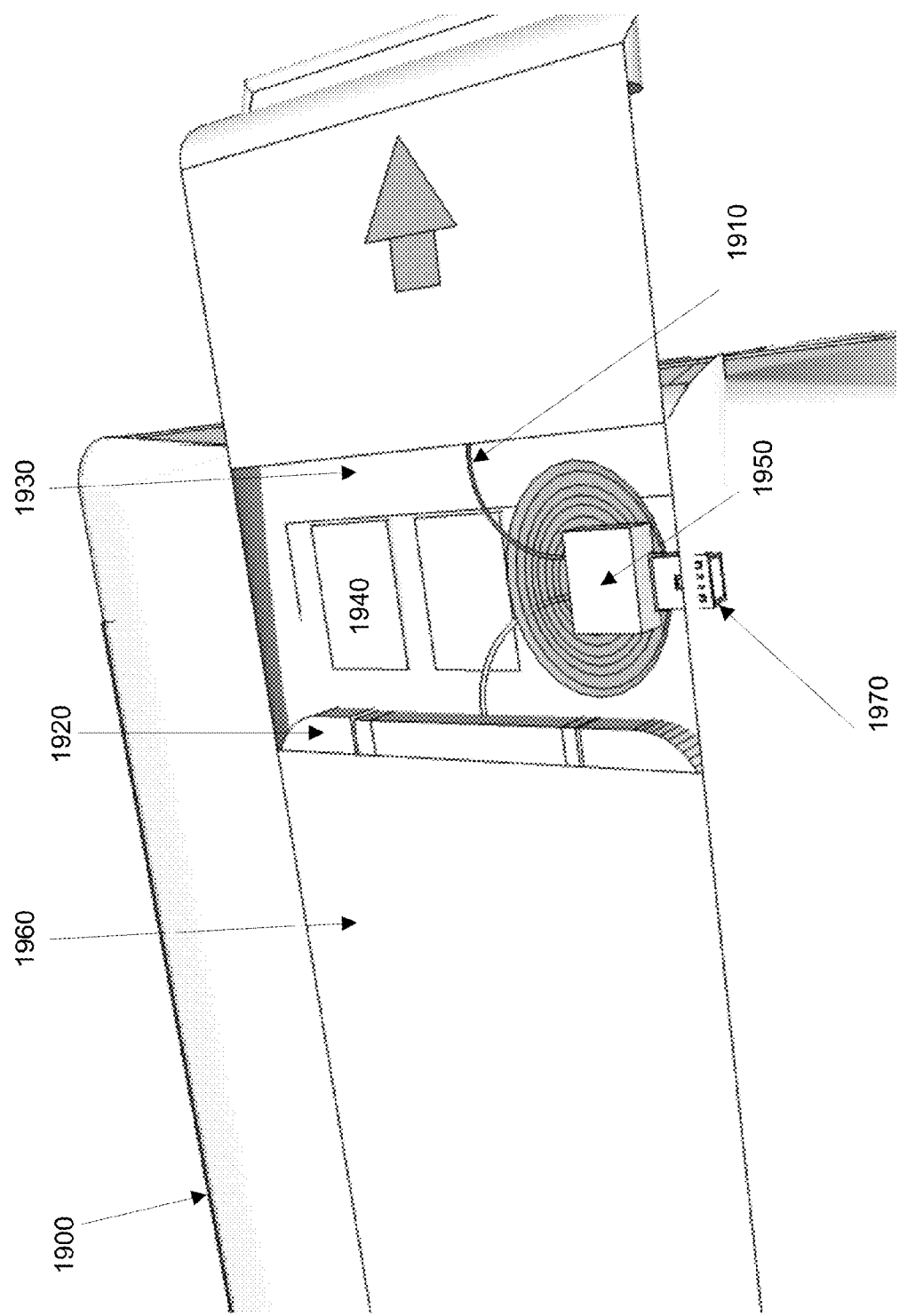
FIG. 19 illustrates a view of a smart device connected with a USB socket through USB cables in accordance with an aspect of the present disclosure.

FIG. 19 illustrates another embodiment showing a first smart device 1900 operatively coupled with a USB socket 1950 through one or more USB cables 1910. USB socket 1950 is also operatively connected to a second smart device 1920 through one or more USB cables 1910, wherein the second smart device 1920 is placed in a housing 1960 of a sleeve 1930, and wherein the sleeve 1930 is affixed to the first smart device 1900. The housing 1960 of the sleeve 1930 can further include an external connector 1970 on exterior surface of the first smart device 1900 to form an external connection between the first smart device 1900, the second smart device 1920, and an externally positioned third smart device or a power source. Housing 1960 in the sleeve 1930 can further be configured with a circuit or chip for communication and power management logic 1950 configured to manage the relationship, power, and other attributes between the first and second smart devices.

Figure 20:
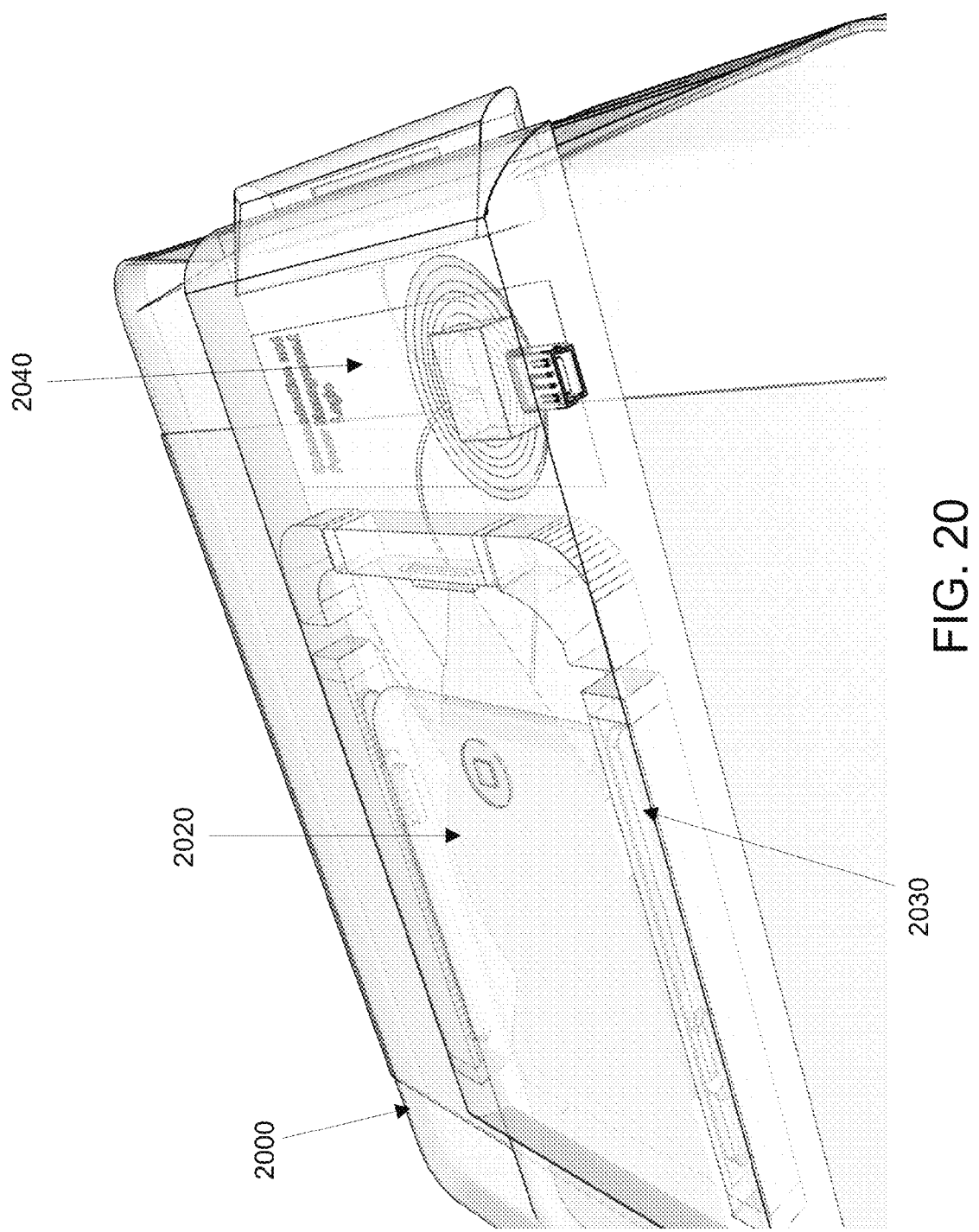
FIG. 20 illustrates a view of a smart device connected with a USB socket through USB cables in accordance with an aspect of the present disclosure.

FIG. 20 illustrates a first smart device 2000 having a second smart device 2020 positioned in its housing 2030. Such a housing, as is clearly disclosed above, can either be a slot or a docking basin within the first smart device 2000 or can be a slot within a sleeve or cover or case of the first smart device 2000, in which the second smart device 2020 can be incorporated. The first smart device 2000 can include a communication and power management logic 2040 for managing communication and power transmission during connection between the first smart device 2000 and the second smart device 2020.

Figure 21:
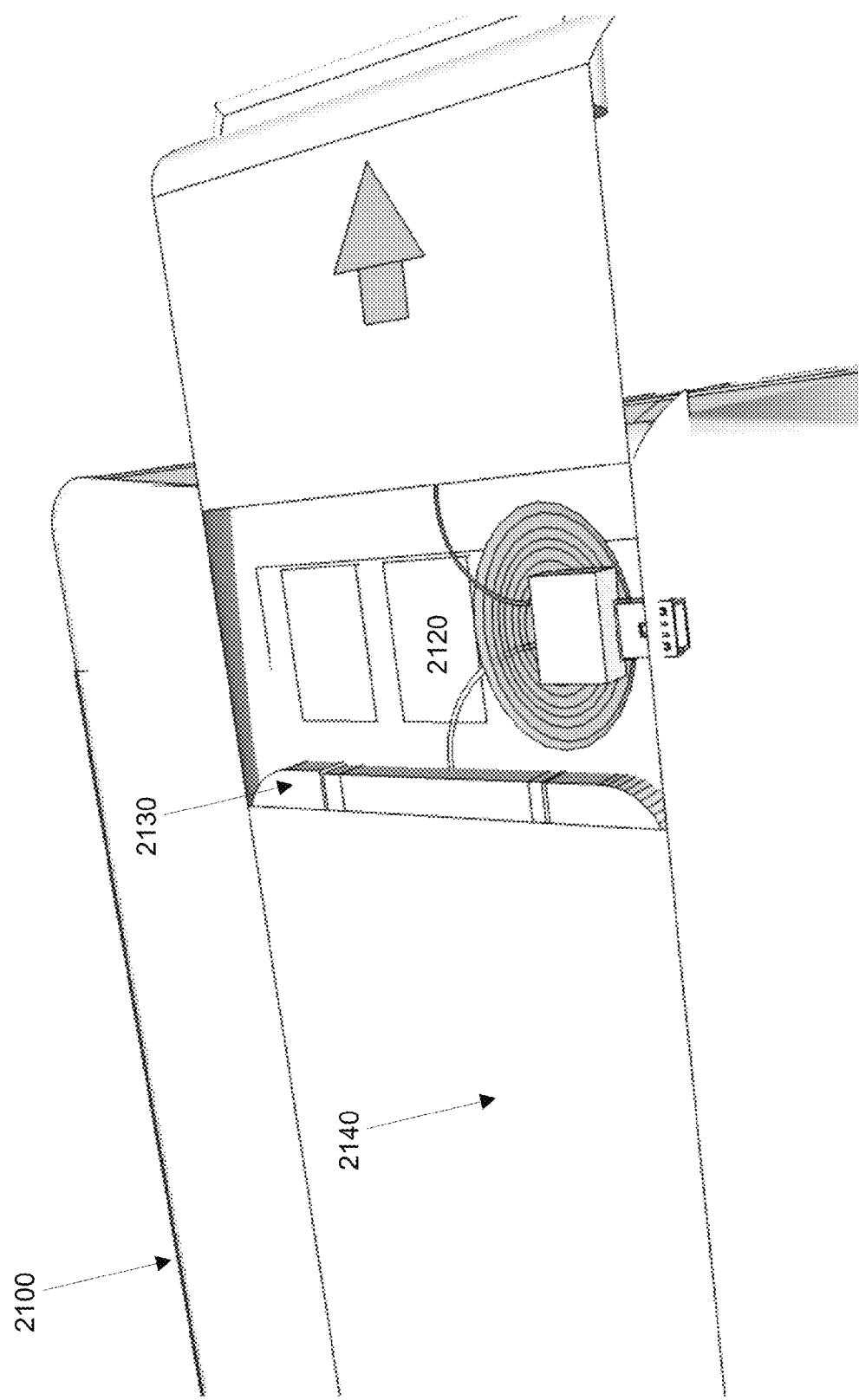
FIG. 21 illustrates a view of a smart device connected with a USB socket through USB cables in accordance with an aspect of the present disclosure.

FIG. 21 illustrates another embodiment of the present disclosure showing a first smart device 2100 having a supplementary battery 2120 placed within its body to receive additional power received in the form of charge during charging for future use. Supplementary battery 2120 can also be configured to provide power to a second smart device 2130 that is received in housing 2140 of the first smart device 2100 or sleeve/cover/case thereof. As supplementary batteries 2120 are typically the same as conventional batteries used in any smart device, construction and structure of the battery 2120 is not being disclosed in detail.

Figure 22:
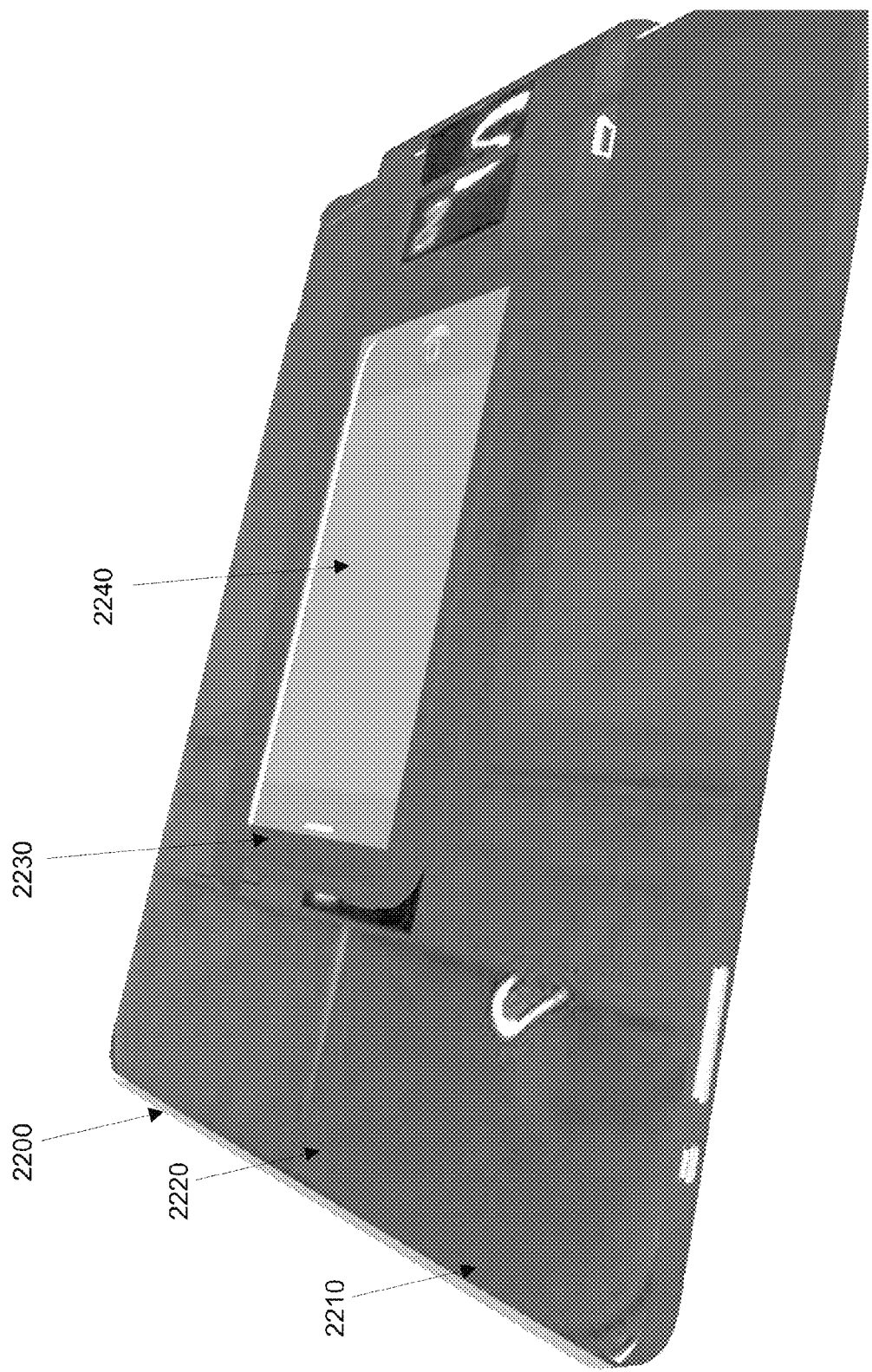
FIG. 22 illustrates a smart device with a housing covered with a zipper/Velcro to receive a second smart device in accordance with an aspect of the present disclosure.

FIG. 22 illustrates another embodiment of the present disclosure showing one side 2210 of a first smart device 2200 that is covered with a Velcro material 2220, wherein the cover made of Velcro material has a housing 2230 for receiving a second smart device 2240. Housing 2230 can be made of any of plastic, glass, fiber material, other like materials, and can be configured to receive the second smart device 2240 such that a physical connection between the first smart device 2220 and second smart device 2240 can be established. In another embodiment, other material such as zipper, soft lips, clasps, elastic material, and the like can also be used to cover one or more sides 2210 of the first smart device 2200 and configure a housing 2230 to receive the second smart device 2240.

Figure 23:
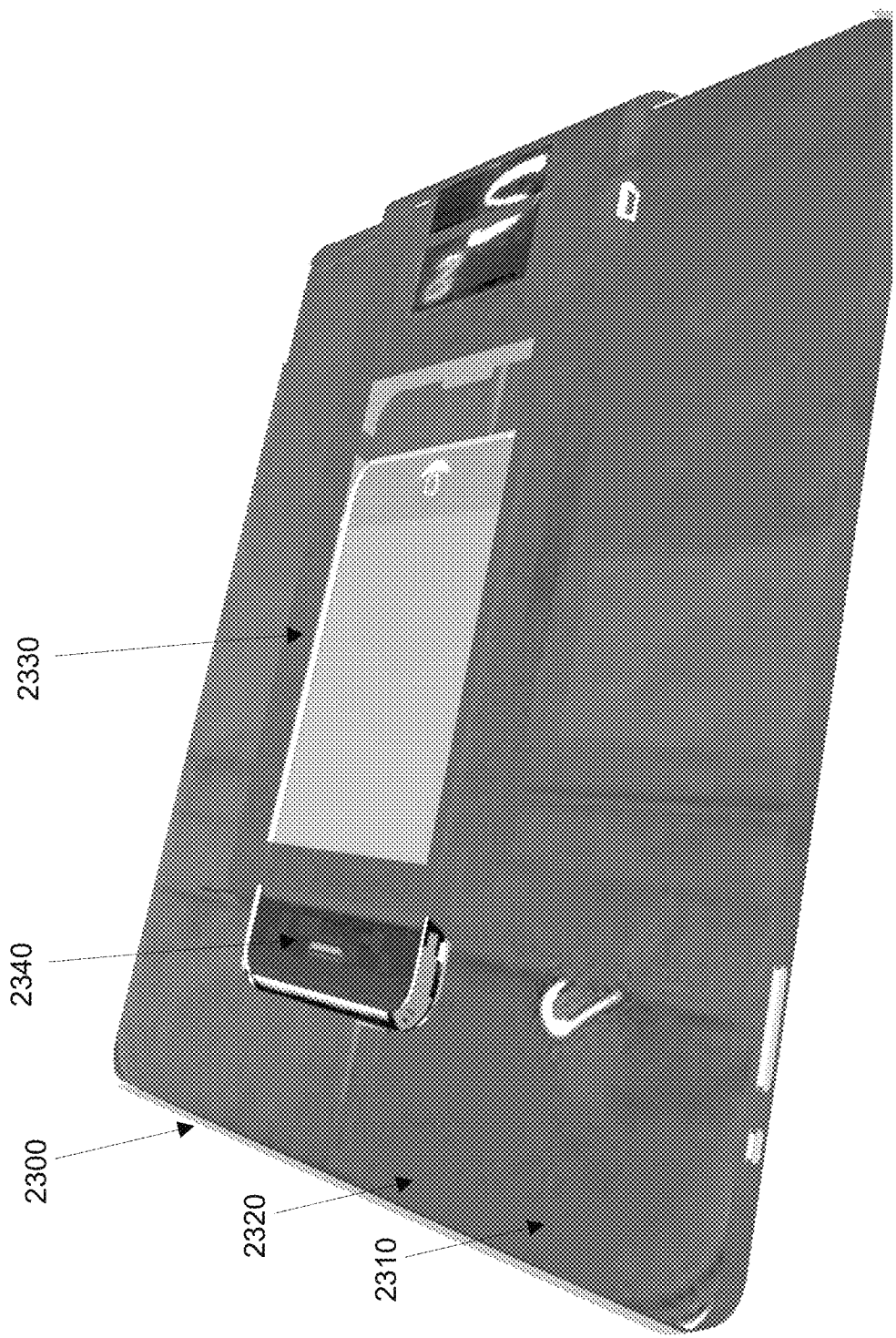
FIG. 23 illustrates a smart device with a housing covered with a zipper/Velcro to receive a front facing second smart device.

FIG. 23 illustrates another embodiment of the present disclosure showing one side 2310 of a first smart device 2300 that is covered with a Velcro material 2320, wherein the cover made of Velcro material has a housing 2330 for receiving a second smart device 2340, and where the touchscreen of the second smart device 2340 faces outwards from the side 2310 of the first smart device 2300.

Figure 24:
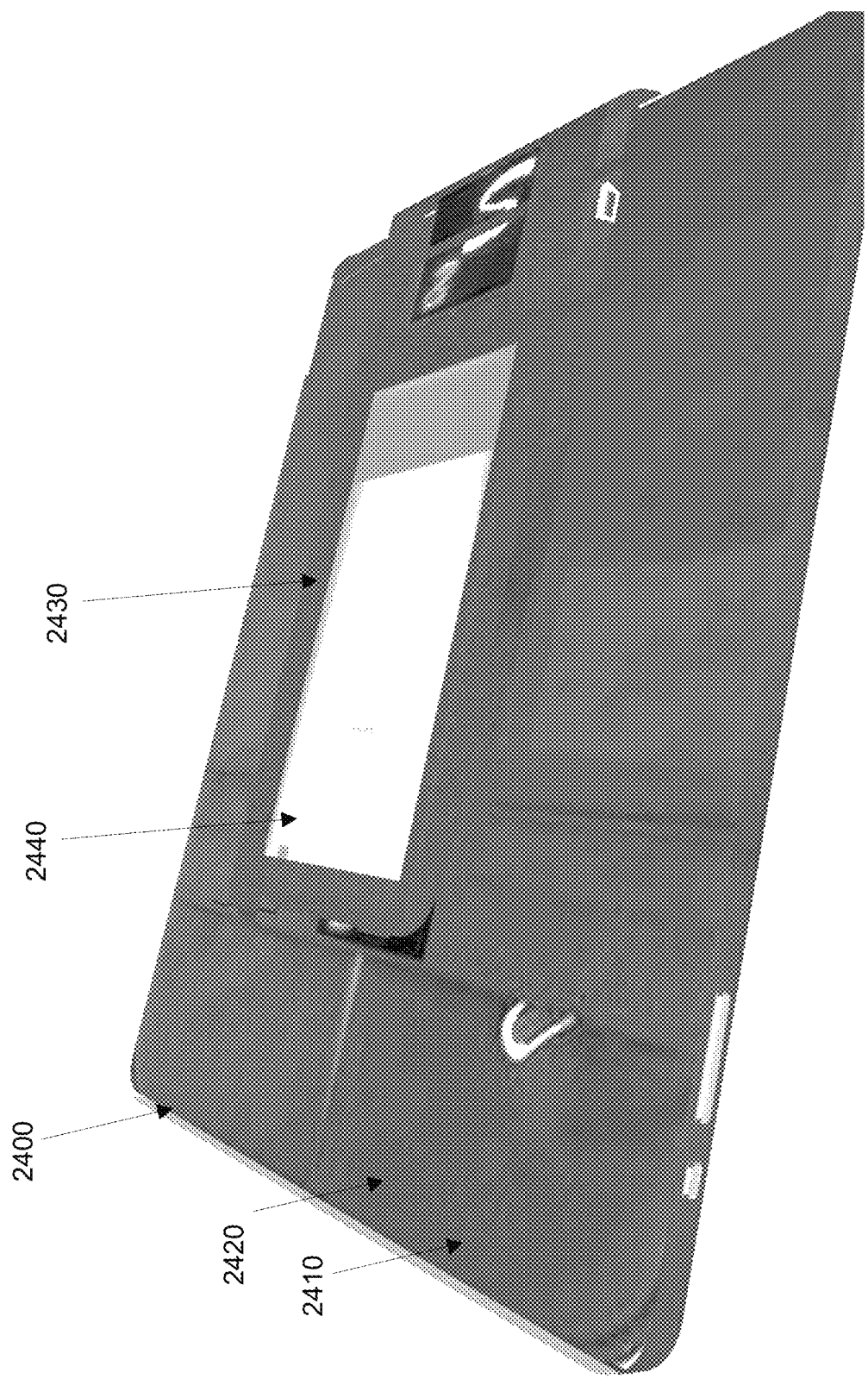
FIG. 24 illustrates a smart device with a housing covered with a zipper/Velcro to receive a rear facing second smart device.

FIG. 24 illustrates another embodiment of the present disclosure showing one side 2410 of a first smart device 2400 that is covered with a Velcro material 2420, wherein the cover made of Velcro material has a housing 2430 for receiving a second smart device 2440, and where the rear end of the second smart device 2440 faces outwards from the side 2410 of the first smart device 2400.

Figure 25:
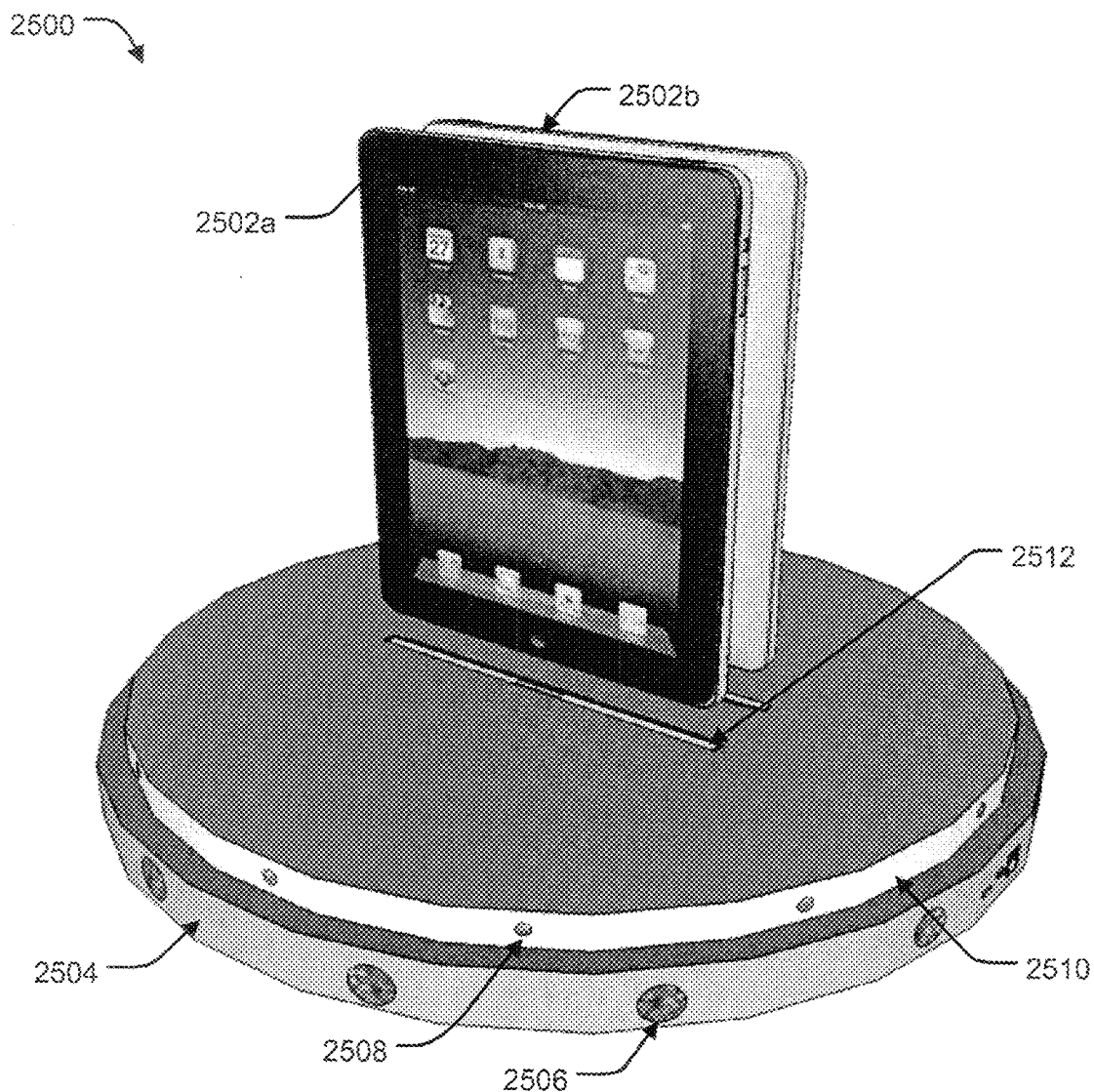
FIG. 25 illustrates a video conferencing apparatus configured to combine two or more smart devices to achieve efficient video conferencing between multiple participants in accordance with an aspect of the present disclosure.

FIG. 25 illustrates a video conferencing apparatus 2500 configured to combine two or more smart devices to achieve efficient video conferencing between multiple participants. Smart devices 2502a, 2502b, ..., collectively referred to as smart devices 2502 hereinafter, can include smart-phone, mobile device, a tablet PC, hand-held pads, smart camera, interactive display boards, and surface computers, among other such devices having similar form factor. Video conferencing apparatus 2500 of the present disclosure is not only configured to perform video conferencing, but can include all other allied video/image based operations or applications.

According to one embodiment, video conferencing apparatus 2500 of the present disclosure can include a base 2504 having one or more speakers 2506 for audio outputs and one or more microphones 2508 for audio inputs from participants of the video conferencing. The configuration and placement of speakers and microphones is a matter of design and can be positioned any desired portion of the base or an elevated platform thereon. It should be appreciated that any positioning or specific placement of the speakers 2506 and/or the microphones 2408 is covered within the scope of the present disclosure. For instance, in the present illustration of FIG. 25, speakers 2506 are positioned on peripheral side of the base 2504, whereas the microphones 2508 are positioned on peripheral side of an elevated platform 2510 formed on the base 2504. In an embodiment, both speakers 2506 and microphones 2508 can be positioned on the base. Alternatively, both speakers 2506 and microphones 2508 can be positioned on the elevated platform 2510. According to one embodiment, apparatus 2500 can include one or more docking bays 2512 configured on the base 2504. Docking bays 2512, also interchangeably referred to as slots or housings hereinafter, are configured to house or position smart devices 2502.

The apparatus 2500 can further include a control means configured to control use of the speakers 2506, microphones 2508, and smart devices 2502 based on the participant speaking and/or attending the video conferencing. The control means can either be external to the apparatus 2500 or internal to the apparatus 2500 such as within the base 2504 of the apparatus 2500. In an implementation, the control means can be configured to measure the signal strength coming from each microphone 2508 of the apparatus 2500 and detect the strongest signal and microphone 2508 associated with the strongest signal. Strongest signal strength can point to the primary participant speaking during the video conferencing session, based on which the control means can activate the corresponding microphone 2508 and deactivate or minimize the effect of all other microphones 2508 and nearest speakers to reduce near-end or self-feedback.

Figure 26:
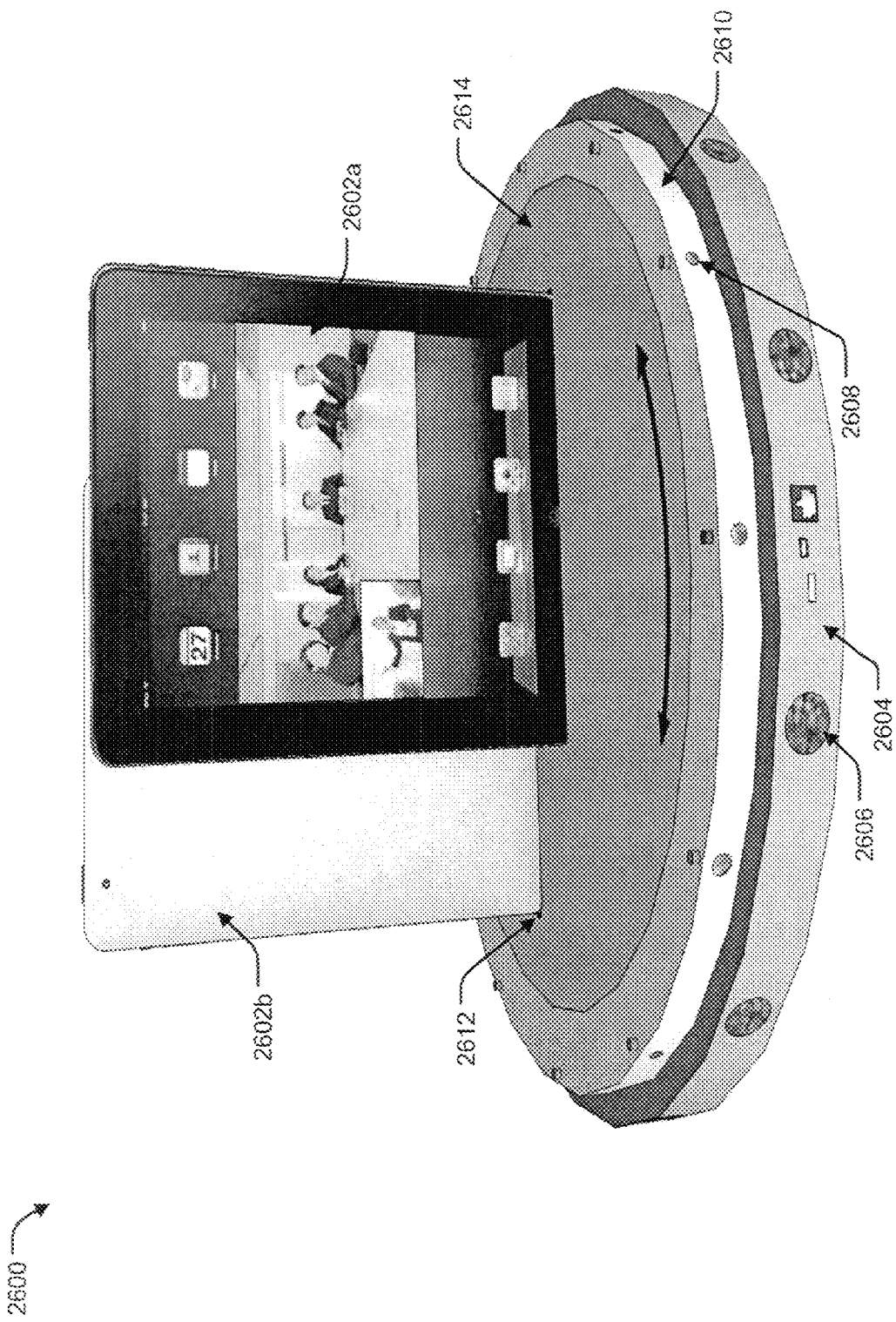
FIG. 26 illustrates another video conferencing apparatus configured to combine two or more smart devices to achieve efficient video conferencing between multiple participants in accordance with an aspect of the present disclosure.

FIG. 26 illustrates another video conferencing apparatus 2600 configured to combine one or more smart devices to achieve efficient video conferencing between multiple participants. Smart devices 2602a, 2602b, ..., collectively referred to as smart devices 2602 hereinafter, can include smart-phone, mobile device, a tablet PC, hand-held pads, smart camera, interactive display boards, and surface computers, among other such devices.

According to one embodiment, apparatus 2600 includes a base 2604 operatively coupled with one or more speakers 2606 and one or more microphones 2608. As discussed above, either of the speakers 2606 and/or microphone 2608 can be positioned on the base 2604 or on elevated platform 2610. Apparatus 2600 can include one or more docking bays 2612 configured on base 2604 and/or elevated platform 2610. FIG. 26 illustrates elevated platform 2610 to have a rotating plate 2614 configured to position docking bays 2612. The rotating plate 2614 can either be directly configured on the base 2604 or on elevated platform 2610 (as shown in FIG. 26). In an embodiment, rotating plate 2614 can also be configured at a level elevated from the base 2604 and/or platform 2610 or in any other desired configuration setup.

According to one embodiment, docking bays 2612, also interchangeably referred to as slots or housings hereinafter, are configured to house or position smart devices 2602. Apparatus 2600 can further include a control means configured to control use of the speakers 2606, microphones 2608, and smart devices 2602 based on the primary participant speaking and/or attending the video conferencing. In an implementation, the control means can be configured to measure the strength of signal from each microphone and activate the microphone 2608 that sends the strongest signal, which indicates the active speaker at the video conferencing. Once the microphone 2608 is activated, control means can also be configured to rotate the rotating plate 2614 with respect to the base 2604 to allow appropriate or desired alignment of the smart device 2602 and camera thereof to view the active speaker.

According to one embodiment, the apparatus 2600 includes two docking bays 2612 and two corresponding smart devices 2602. As shown in FIG. 26, the two smart devices 2602 can be positioned such that their rear sides face each other. Facing of rear sides allow cameras of both smart devices 2602 to be working in tandem and taking images of the participants in real time without having to rotate by 360° each time. Furthermore, in order to create an unobstructed view of the cameras, docking bays 2612 can be positioned outwards from each other. Such outward positioning of bays 2612 with respect to each other allows creation of an unobstructed view at any given time. Furthermore, as most of existing smart devices 2602 also have cameras on both the sides (front and rear), the rotating plate 2614, when aligned to a particular participant of the video conference, can allow front camera of device 2602*a* and rear camera of device 2602*b* to view the same participant and take two images at any given time. Processing of two images or video streams can then allow creation a 3D image or video stream of the respective participant giving a more real-time experience.

In an embodiment, docking bays 2612 can be of any size, shape, orientation, or alignment so as to allow all smart devices 2602 to be coupled with the base 2604. In an embodiment, the bays 2612 can be parallel to each other to allow efficient use of space and image/video processing. To allow efficient connection with other hardware or firmware devices, base 2604 of the apparatus 2600 can be configured to incorporate multiple ports such as USB ports, HDMI ports, RJ-45 ports, among other such interfaces/ports for enabling functions relating to power, switching, display, transmission, reception, among other such other functions.

According to one embodiment, apparatus 2600 can include an indicator 2616, such as a LED indicator, to indicate whether a microphone 2608 is active at that instant. Indicator 2616 can be controlled by the control means during detection of signal strengths coming from the microphones 2608 such that sooner a microphone 2608 is activated based on its energy/strength being strongest, the corresponding indicator 2616 can be configured to indicate the activation to other participants. As the design, position, and configuration of speakers 2606 and/or microphone 2608 can be changed as desired, position of indicators 2616 can also be changed such that it on either on the base 2604, or on the platform 2610, or on the plate 2614. It should be appreciated that usually all microphones 2608 are active to capture audio signals but the one which receives the strongest signal can be used as a measure to detect the active participant and compute the direction of the apparatus to tune the sensitivity of other microphones and also reduce the output of the closest speakers 2606 in order to avoid feedback. This is also used to steer the base to point the active camera(s) in the direction of the strongest audio.

According to another embodiment, speakers 2606 of apparatus 2600 can be configured with feedback avoidance logic so as to reduce/remove the noise, interference, or any other undesired component from any of the speaker output or microphone input. Each speaker 2606 can also be configured so as to cause least near-end or self-feedback from other speakers 2606.

According to one embodiment, instead of a single control means, multiple control mechanisms can be implemented to control one or more of base operation, speaker operation, microphone operation, platform operation, rotating plate operation, among other components of the video conferencing apparatus. Base operation can be implemented through a single board computer (SBC) logic, which interfaces with docked smart devices for providing an enhanced 360° conference operation, resulting in improved user experience. SBC logic can be configured to detect audio energy and determines direction of the strongest microphone and use the knowledge to enhance audio performance by selectively decreasing/increasing sensitivity of selected microphones as well as lowering output of speakers closest to the strongest microphone.

According to another embodiment, in case the smart devices are positioned on a rotating plate 2614, SBC logic can, based on audio energy/strength signals received, use the decision to steer the rotating plate 2614 such that one smart device 2602 is aligned in the direction of the strongest audio energy, enabling front facing camera of the smart device 2602 to point to the speaking conference participant. If another smart device with a back facing camera is also docked in the docking bay, the back facing camera of the smart device also points in the same direction to that of the first smart device camera allowing two video streams from the same direction to be processed for 3D image compatible flat panel displays. The control means or SBC logic can either process the two video streams locally and send an output stream to conference server or configure the conference server to perform 3D conversion and send the 3D images to 3D capable remote conference endpoints. In an implementation, the conference server can be configured such that the server has knowledge of individual remote endpoint's processing capabilities and preferences.

Figure 27:
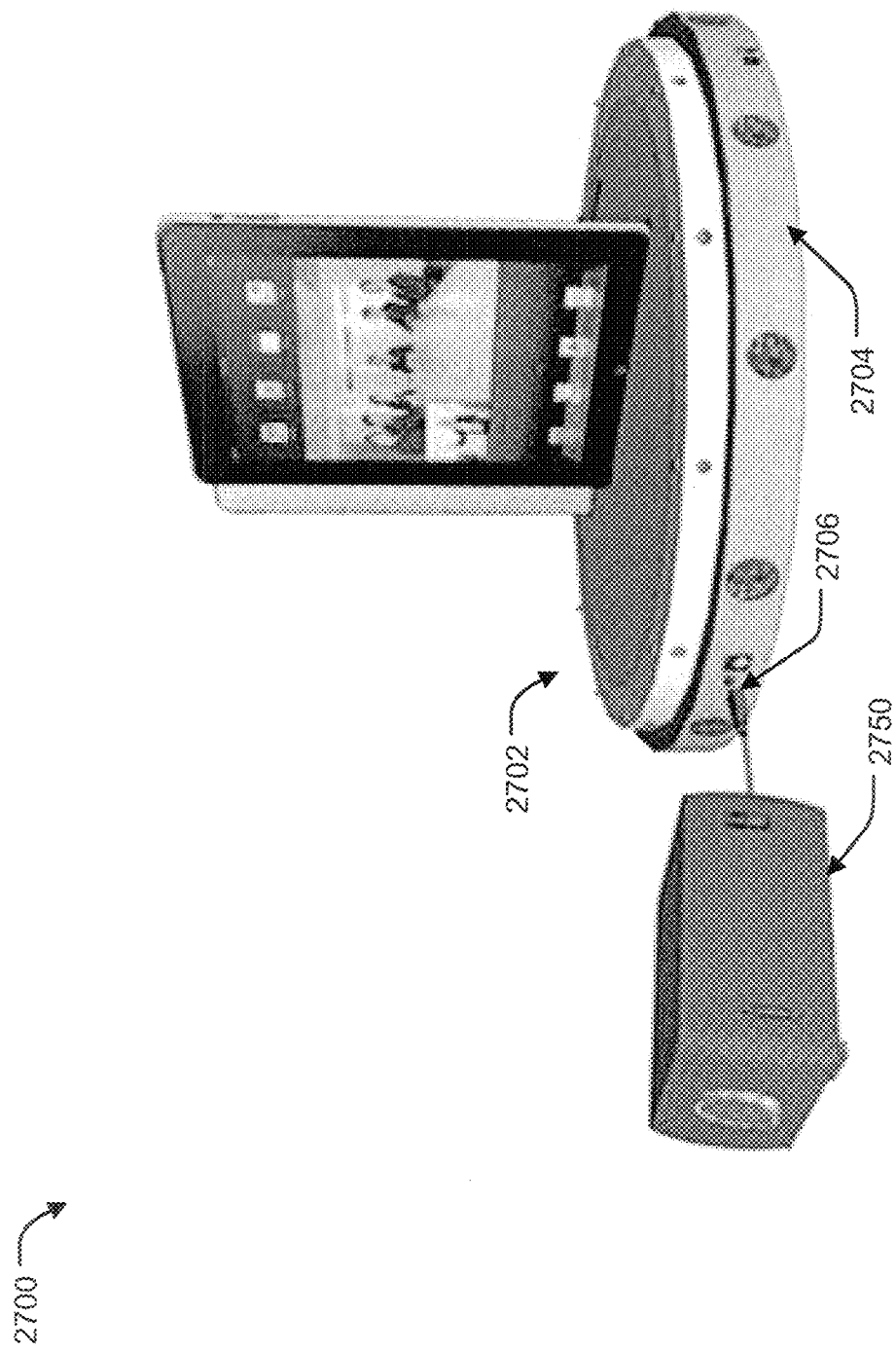
FIG. 27 illustrates a video conferencing apparatus configured with a projector in accordance with an aspect of the present disclosure.

FIG. 27 illustrates a video conferencing apparatus 2702 configured with a projector 2750. As the structure and construction of the apparatus 2702 is similar to the embodiments explained above, the construction or function of each element thereof is not being described again. As illustrated in FIG. 27, base 2704 of apparatus 2702 includes one or more ports/communication interfaces 2706 that allow connection of one or more projectors 2750, flat-panel displays, or other desired devices to the apparatus 2702. As any existing projector 2750 can be coupled with the apparatus 2702, function and construction of the projector 2750 is not being explained herein.

Figure 28:
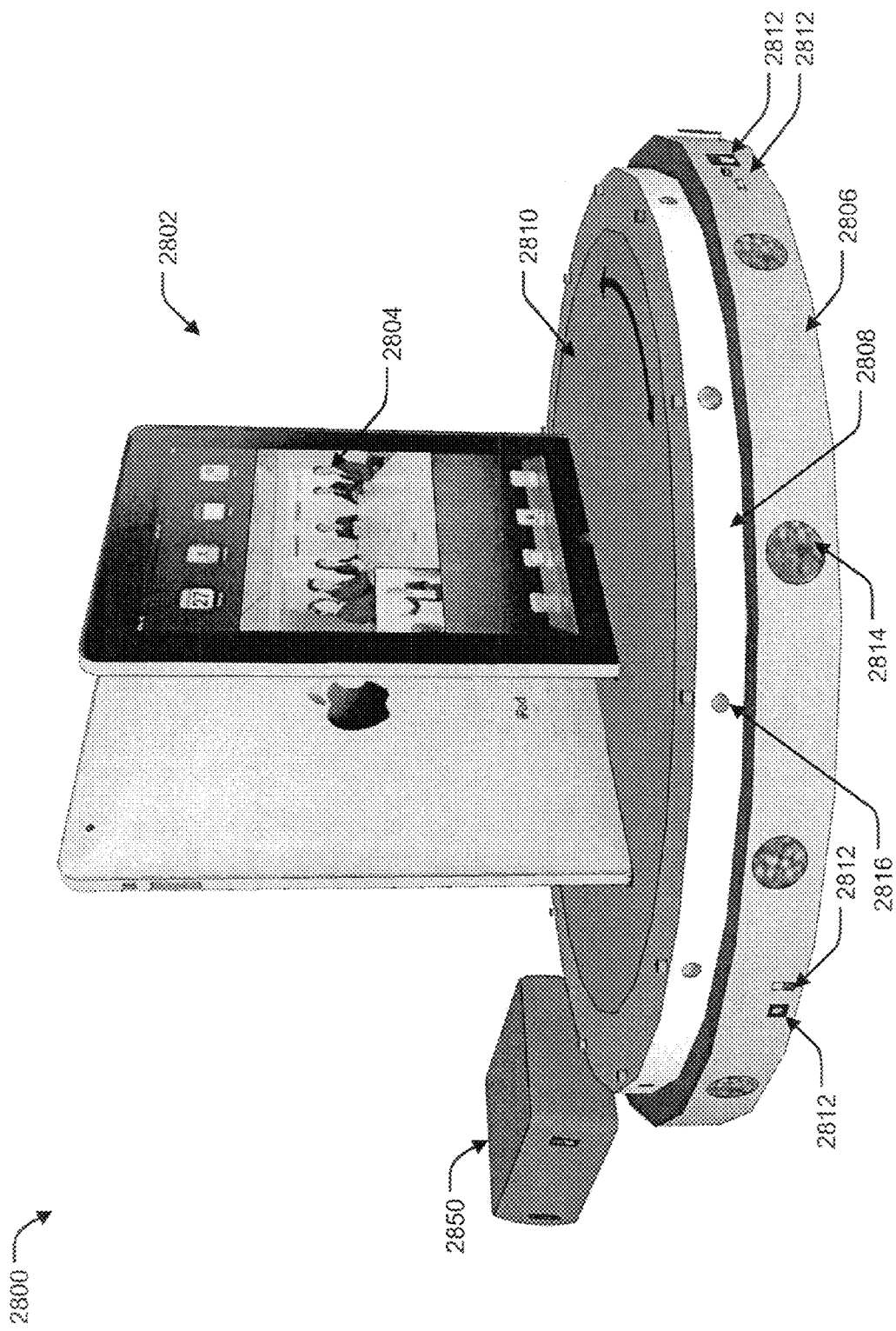
FIG. 28 illustrates another video conferencing apparatus configured with a projector in accordance with an aspect of the present disclosure.

FIG. 28 illustrates a video conferencing apparatus 2802 configured with a projector 2850. As the structure and construction of the apparatus 2802 is similar to the embodiments explained above, the construction or function of each element thereof is not being described again in detail. The apparatus 2802 includes one or more smart devices 2804 configured on a base 2806 through an elevated platform 2808 that has a rotating plate 2810. Smart devices 2804 can be positioned on docking bays, which can be aligned outward from each other before enabling unobstructed view and 3D image creation. Exemplary illustration of FIG. 28 shows two smart devices 2804 which are located outward from each other such that back facing camera of one smart device and front facing camera of the other smart device point in the same direction. Apparatus 2802 can further include one or more communication/date interfaces or ports 2812 including but not limited to HDMI, USB, RJ-45, among other such ports. Exemplary illustration of FIG. 28 further shows speakers 2814 configured on peripheral side of base 2806 and microphones 2816 configured on peripheral side of base elevated platform 2808.

Figure 29:
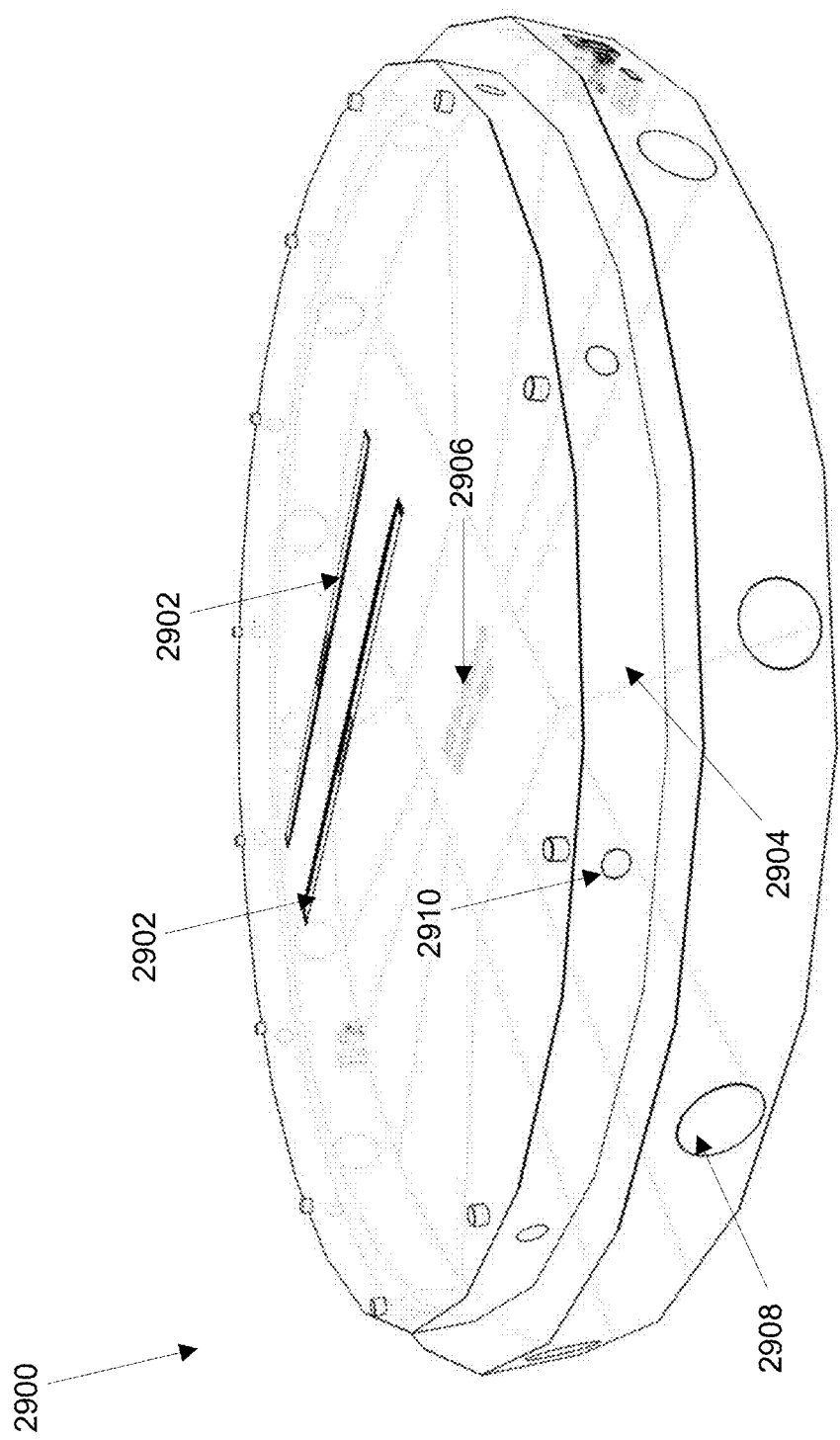
FIG. 29 illustrates base of a video conferencing apparatus in accordance with an aspect of the present disclosure.

FIG. 29 illustrates base 2900 of a video conferencing apparatus. As explained above, base 2900 can either be configured to position docking bays 2902 directly on itself or can be configured to have an elevated platform 2904, which positions the docking bays 2902. In an embodiment, control means 2906 of the video conferencing apparatus can be implemented within the base 2900.

According to one embodiment, as illustrated in FIG. 29, one or more speakers 2908 can be configured on peripheral side of the base 2900. Similarly, one or more microphones 2910 can be configured on peripheral side of elevated platform 2904. In alternate embodiments, as described above, the speakers and the microphones can both be positioned on the base 2900 and/or the platform 2904 in any combination. In another embodiment, the speakers and the microphones can also be made more directional by appropriately indenting them within the side body of the base 2900. Base 2900 can also be configured to incorporate one or more communication interfaces and/or ports on the base 2900 to allow external connections or coupling with multiple desired devices.

According to one embodiment, smart devices can be configured on the docking bays 2902 such that along with enabling the functionality of video conferencing through their respective cameras, the devices can also be operatively coupled to allow one or more of charging, data transfer, transfer of sessions, and transfer of settings, among other desired functionalities.

It would be appreciated that even through the above embodiments have been disclosed and explained with respect to a video conferencing application, the disclosure is only an exemplary illustration of the manner in which smart devices can be physically and/or logically coupled with each other. Any other application including video chats, video calls, image transmission/processing applications, among other such real time video/image based applications are covered within the scope of the present disclosure.

Figure 30:
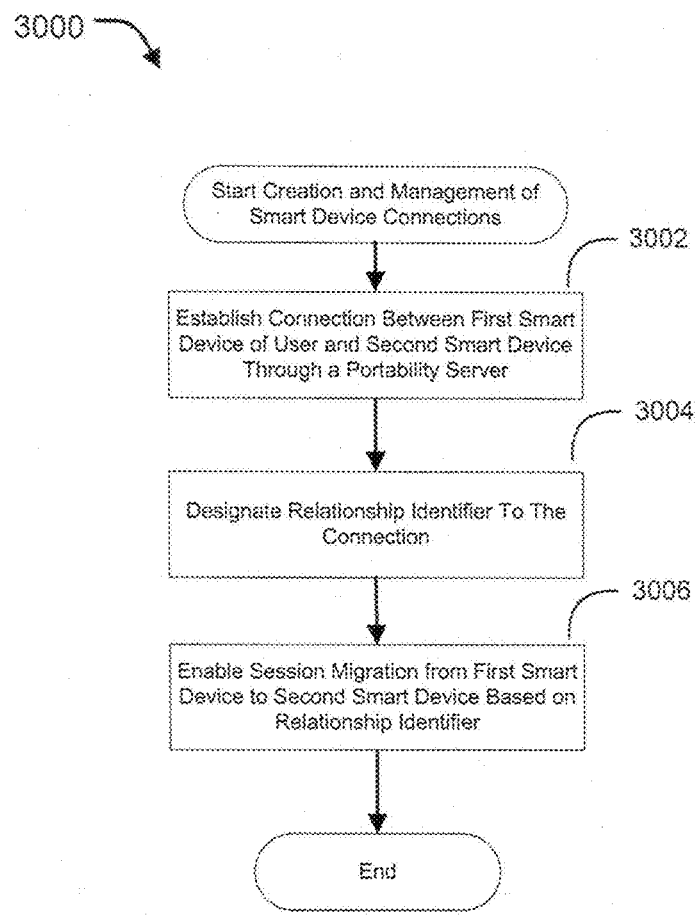
FIG. 30 illustrates a method for creating and managing connection between two or more smart devices in accordance with an aspect of the present disclosure.

FIG. 30 illustrates a method 3000 for creating and managing connection between two or more smart devices. Connections between multiple smart devices can be used for one or more of data transfer amongst devices, session migration from one device to another, sequential processing of a given set of instructions, functions or applications, and parallel processing of a given set of applications or functions, among other such purposes. Smart devices can include smart-phone, mobile device, a tablet PC, hand-held pads, smart camera, interactive display boards, and surface computers, among other similar form-factor based devices.

At step 3002 of method 3000, a connection is established between a first smart device being used by a user and one or more second smart devices. Such a connection can be established based on vicinity between the given first smart device and a number of other second smart devices in its range. According to one embodiment, connectivity between the first smart device and the second smart device can be established through a physical connection such as through a port/communication interface (USB, IEEE 1394, etc.), through hardware coupling between smart devices such as by positioning the first smart device into a housing of the second smart device such as through embodiments explained for FIG. 1-24, or through a wireless connection (WAN, Wi-Fi, Bluetooth, ZigBee, NFC, etc.) between the devices. In implementation, first smart device can be configured to identify all second smart devices in its range and based on one or more of preferences of the user of first smart device, computational or functional capabilities of the first and second smart devices, limitations of the second smart devices, negotiation between first and second smart devices, among other such parameters, identify the desired second smart device and establish connection with the same.

According to one embodiment, a portability server, such as a media portability server, can be used as an adjunct, cloud, or a proxy server for establishing the connection between first and second smart devices. In operation, first smart device of the user can, automatically or on user request, query the portability server to identify smart devices in the range of first smart device and select the second smart device from a list of smart devices identified by the portability server. According to another embodiment, each smart device can be provided with a connection manager that can, in an instance, be implemented as a thin client or as a full featured client application, and store user preferences, device capabilities, limitations, settings, to manage establishment, maintenance, and release of connections.

According to one embodiment, connection between first and one or more second smart devices can be formed based on the type of network. For instance, the connection can be allowed to be formed by a user of first smart device only when the network is a private area network (PAN) and disallowed by the user when the network is a public network or unknown or not in the preferred list.

At step 3004, once a connection between first and second smart devices is established, a relationship identifier is designated to the connection, wherein the relationship identifier dictates the relationship or configuration between the first and second smart devices. The relationship identifier can be configured to assign one of a master-master relationship, master-slave relationship, or stand-alone relationship between the two or more devices. A stand-alone relationship, also interchangeably referred to as docking-only relationship, configures both the devices to work independent of each other with no specific defined rights associated with the execution of functions of each other. For instance, in case the second smart device such as a tablet PC has a housing (such as in FIG. 1) to place the first smart device such as a smart-phone within itself, both of them, although connected, might not share a specific relationship on the manner in which both would execute functionalities or share data/content/sessions between each other.

According to one embodiment, relationship identifier can be designated based on factors including preference of user that operates the first smart device, hardware or functional capabilities of first and second smart devices, characteristics of the network in which the connection between first and second smart devices has been established such as bandwidth, speed, among other characteristics of the network, and limitations of the first and second smart devices, among other such factors. According to one embodiment, connection manager of each device each be configured to form the relationship between first and second smart devices and associate the identifier with the relationship.

According to an embodiment, depending on the relationship identifier associated with each connection, the second smart device, also interchangeably referred to target host hereinafter, functions either as a master with complete rights to execute any function or access content of the first smart device, or can act as a slave with limited execution capabilities, or can act only as a docking device with only having a display and a keyboard (physical or virtual). First smart device can similarly also take multiple modes or relationship format but in a preferred embodiment, would act as a master.

According to another embodiment, relationship identifier can, apart from defining the relationship between the two smart devices, also be configured to define the manner in which each of them would independently function or operate when connected with each other. Identifier can also, through connection manager, change internal settings of each smart device including but not limited to privacy settings, security settings, authentication settings, data transfer settings, among other allied parameters that would affect the manner in which both the devices would individually or collectively work together when connected.

At step 3006, once the relationship identifiers have been associated with the first and second smart devices, one or more applications, functions, and content/information, can be processed between the first and second smart devices based on the corresponding relationship identifiers. According to one embodiment, connection of two or more smart devices can be configured to enable one or more of data transfer between the smart devices, session migration from the first smart device to the second smart device and visa-versa, sequential processing of functions/data between first and second smart devices, and parallel processing between first and second smart devices.

Figure 31:
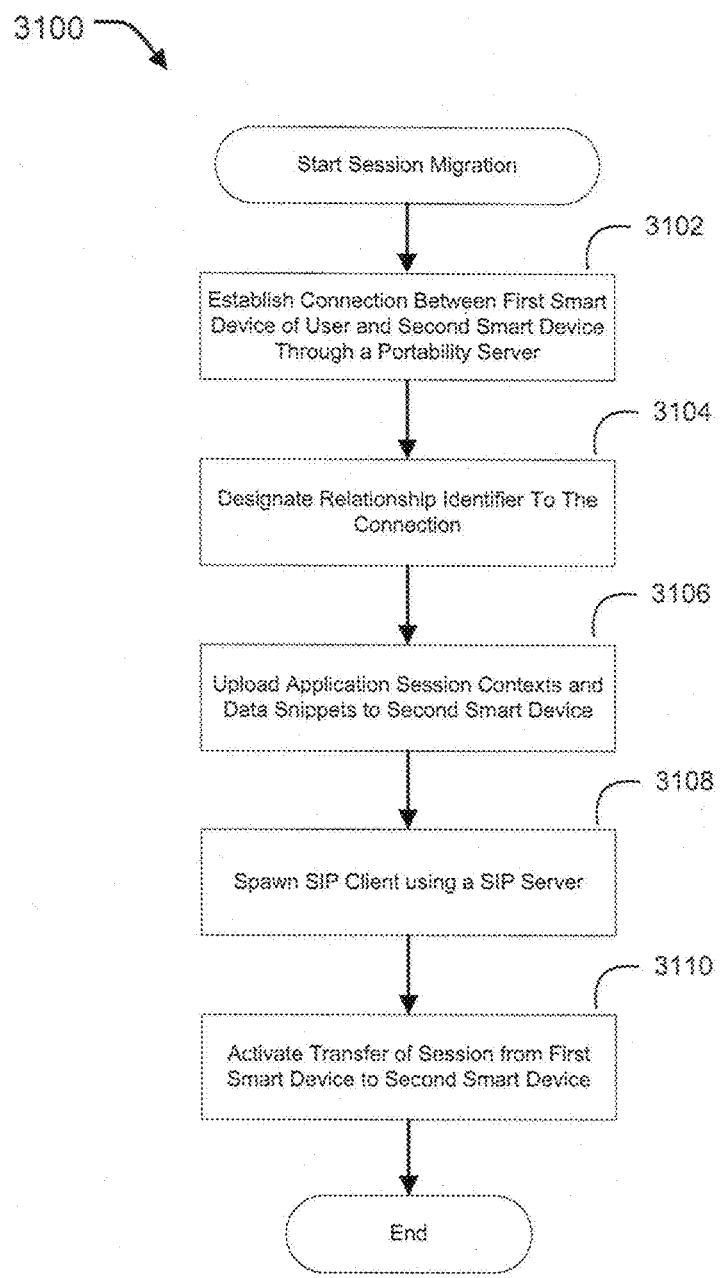
FIG. 31 illustrates a method for migrating session from first smart device of a user to a second smart device in accordance with an aspect of the present disclosure.

According to one embodiment, connection between the first and second smart devices can be used for migrating existing or ongoing sessions from the first device to the second device. For instance, in case a user wishes to transfer a particular mobile application session from a smaller display based smart-phone to a relatively larger display tablet PC, once the connection between the smart-phone (first smart device) and tablet PC (second smart device) has been established and designated with an identifier, an ongoing session such as in an internet browser of the smart-phone can be transferred to the tablet PC using a SIP server and other required connection parameters to ensure seamless transfer of session without any loss of content or execution context. FIG. 31 explains the session migration between smart devices in detail.

FIG. 31 illustrates a method for migrating one or more sessions from first smart device of a user to a second smart device. Session migration can take place for any or more of mobile applications such mobile browser, audio/video chats, social media applications, video surveillance applications, audio/video live communication, office suites, gaming applications, industry-specific applications such as patient monitoring, healthcare related applications, among other such applications/features/functionalities.

Step 3102 provides for establishing a connection between first and second smart devices, where the first smart device is operated by the user and intends to connect to the second smart device to be able to user the computational, functional, hardware, or structural resources of the second smart device. In an exemplary embodiment, connection between the first and second smart devices can be formed through a portability server, as has already been explained in the previous embodiments of FIG. 30 and hence not being repeated again.

At step 3104, a relationship is designated to the connection formed between the first and second smart devices. Such a relationship can be a master-master relationship in case the user wishes to perform all functions that were executed on first smart device with same rights on the second smart device or can be master-slave relationship in case limited rights need to be given to the second smart device.

At step 3106, once a relationship identifier has been designated, session migration can be triggered either automatically or through an explicit user request. Once triggered, connection manager of the first smart phone can be configured to initiate upload of Application session contexts and/or data to the target host/second smart device.

At step 3108, once Application session contexts and/or data corresponding to the existing active/inactive sessions have been uploaded onto the second smart device, a session initiation protocol (SIP) can be spawned by connection manager of second smart device using a SIP server. In implementation, connection manager of the second smart device/target host, upon completion of the upload of application session context and/or data, analyses the information and starts the migrated application with required portability related information. The application can then initiate transfer of application session with its peer on the first smart device using SIP session dialog transfer by means of SIP re-INVITE or SIP REFER/REPLACE dialog. According to one embodiment, the session migration can be conducted using protocols comprising SIP/SDP, HTTP, HTTPS, HTTP-5, among other applicable internet multimedia protocols.

At step 3110, once the SIP client has been created, transfer of session from the first device to the second smart device can be activated. During the process of activation, the first smart device can act as a proxy to the second smart device for the sessions. In another embodiment, an external network entity that is either adjunct to the portability server or is in the path to the second smart device can also be configured as a proxy. Upon migration of the application session such as internet browsing from first device to the second, the user can continue to browse through the second smart device in accordance with the preferences or restrictions provisioned by the user prior to migrating the applications.

According to one embodiment, when the user decides to discontinue the connection formed between the first and second smart devices, application sessions can be restored back into the first smart device. To support this, the user can trigger to reclaim the sessions back on the first smart device, wherein such a trigger can be an appropriate menu selection option in the connection manager of the first smart device. Upon selection by the user, the first smart device instructs the second smart device to send back all the applications' active sessions along with the necessary end-user data. In an embodiment, such a trigger can instruct the portability server to initiate application session transfer as described above but now in the reverse direction from second smart device to first smart device. Once the session has been transferred, the second smart device can be configured to securely destroy all locally cached copies of the session data.

Figure 32:
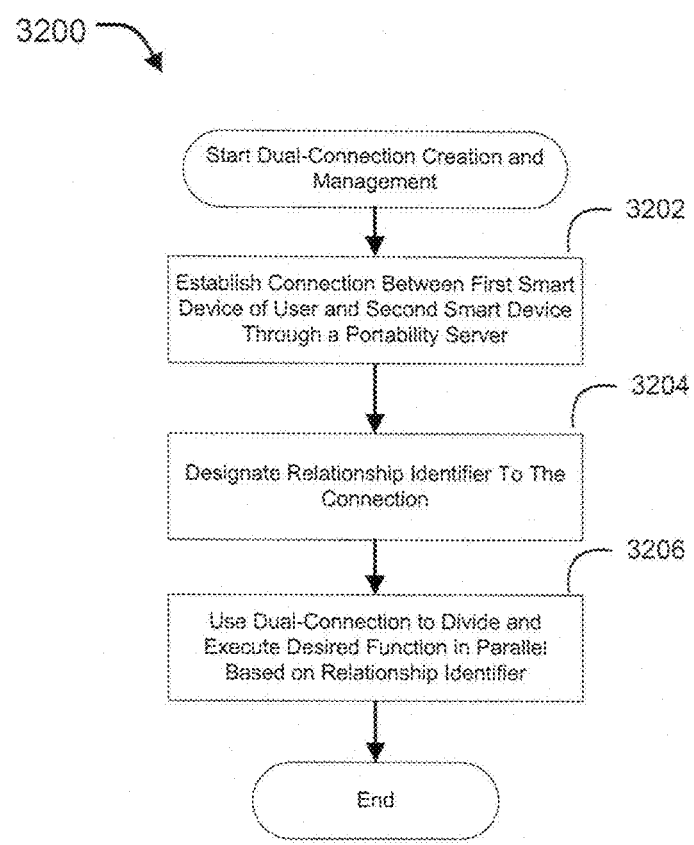
FIG. 32 illustrates a method for using dual connection between first and second smart devices for parallel processing between the devices in accordance with an aspect of the present disclosure.

FIG. 32 illustrates a method for using dual connection between first and second smart devices for parallel processing between the devices. At step 3202, a connection is first established between first smart device of a user and second smart device. Such a connection, as discussed above, can either be formed through a portability server or without the same such that the first smart device identifies all smart devices in a given range and then based on user preference, limitations of smart devices, capabilities of smart devices, among other factors, chooses one or more second smart devices to get connected with.

At step 3204, connection between the first and second smart devices is designated with a relationship identifier, which governs or dictates the relationship format between the smart devices in terms of how functions/applications/content would be processed between the smart devices.

At step 3206, once a dual connection has been established and designated through a relationship identifier, a desired function can be divided for execution between the first and second smart devices such that parallel processing of the function allows efficient performance of the device resources, computational capability, and faster execution. For instance, the function can include downloading of a movie, wherein in an implementation of the present method, the movie can be divided into two or more segments, both of which can be assigned to each smart device for independent downloading, and once downloaded, the respective segments can be logically combined to allow seamless user watching experience and efficient buffering of the streaming data.

According to one embodiment, an ongoing movie session can also be ported from the first smart device to a second smart device. In such a case, instead of continuing the downloading only at the second smart device, the movie can be divided into two or more segments and based on the capability, resource utilization, among other factors relating to the smart devices, and the segments can be allocated to each smart device for downloading. Once downloaded, the segments can be concatenated on the smart device that is designated as a master for storing the content in accordance with the pre-provisioned user preferences and user restrictions based on device capability.

According to one embodiment, when the user decides to take away the first smart device, ongoing sessions can be ported back to the first smart device through an appropriate menu option to pull or revoke the application sessions from the second smart device. Upon completion of the reinstatement of the sessions on the first device, an indication can be presented to the user signaling that the first smart device is now disconnected and can be removed from the second smart device.

It should be appreciated the above mentioned instance of movie download is only an exemplary illustration, and any other allied data transfer, application processing, content processing, can be shared across sessions by performing parallel processing of the desired functions.

While embodiments of the present disclosure have been illustrated and described, it will be clear that the disclosure is not limited to these embodiments only. Numerous modifications, changes, variations, substitutions, and equivalents will be apparent to those skilled in the art, without departing from the spirit and scope of the disclosure, as described in the claim.

What is claimed is:

1. A video conferencing apparatus comprising:
a conferencing computing device base comprising one or more processors and operatively coupled to a communication interface and one or more internal data storages, wherein the base is configured to host at least one speaker or at least one microphone;
a plurality of docking bays configured on the conferencing computing device base, wherein the plurality of docking bays are each configured to detachably receive one of one or more smart devices and the conferencing computing device base is configured to identify each of the one or more smart devices detachably coupled into one or more of the plurality of docking bays and transmit identity characteristics of the one or more smart devices to a media portability server, wherein the conferencing computing device base assists one or more smart devices obtain a list of the one or more smart devices registered in the conferencing computing device base and the conferencing computing device base filters one or more known smart devices registered in the conferencing computing device base based on address data obtained from an address book in each of the one or more smart devices, wherein a relationship identifier is designated by the conferencing computing device base for ach connection with one of the one or more smart devices and is selected from one of a master-master relationship, a master-slave relationship, or a stand-alone relationship and wherein the base has an independent communication channel with each of the one or more smart devices; and
a control device configured to control use of one or more of the speaker, said the microphone, and camera of the smart device based on video conference activity received from one of the smart devices.

2. The video conferencing apparatus of claim 1, wherein the conferencing computing device base further comprises a rotatable plate configured in the conferencing computing device base, wherein the plurality of docking bays are configured on the rotatable plate, and wherein the control device is configured to control the rotation of the rotatable plate based on received user input.

3. The video conferencing apparatus of claim 1, wherein the first docking bay of the plurality of docking bays is configured to position a first smart device and a second docking bay of the plurality of docking bays is configured to position a second smart device, wherein the first docking bay and the second docking bay are positioned such that a view from respective cameras for the first smart device and the second smart device are unobstructed.

4. The video conferencing apparatus of claim 3, wherein the first docking bay and the second docking bay are positioned such that the first smart device and the second smart device with have their rear surfaces facing each other.

5. The video conferencing apparatus of claim 3, wherein the first smart device and the second smart device are operatively coupled by the conferencing computing device base to allow one or more of charging, data transfer, transfer of sessions, a multimedia session migration, a multimedia session redirection, a sequential processing, or a parallel processing and transfer of settings between the video conferencing apparatus and the one or more smart devices based on a designated relationship identifier.

6. The video conferencing apparatus of claim 1, wherein one or more pairs of the plurality of docking bays are positioned parallel to each other, and wherein the plurality docking bays are shifted outward from each other to allow an unobstructed view and creation of three dimensional images using front and rear cameras of the smart devices.

7. The video conferencing apparatus of claim 1, wherein the base further comprises an elevated platform configured, wherein the conferencing computing device base is further configured to position speakers and/or microphones on peripheral sides of the conferencing computing device base.

8. The video conferencing apparatus of claim 1, wherein the control device detects energy from each of one or more microphones for the one or more smart devices and controls activation of a first microphone the one of the microphones sending strongest energy signal, wherein the control device controls direction of the conferencing computing device base with the plurality of docking bays based on the activation of the microphone.

9. The video conferencing apparatus of claim 1, wherein the conferencing computing device base comprises one or more indicators corresponding to each of one or more microphones for the one or more smart devices, wherein each of the one or more indicators indicator is configured to indicate whether a respective one of the one or more microphones for the one or more smart devices is on or off.

10. The video conferencing apparatus of claim 1, wherein the conferencing computing device base comprises one or more communication interface devices and ports, and wherein the communication interface devices and ports are configured to connect with one or more of projector, display devices, computing devices, and hardware devices on a local base or a remote base through secured connections established by user of the conferencing computing device base and the media portability server, wherein the communication interface devices and ports are selected from one or more of HDMI, RJ-45, and USB interfaces.

11. The video conferencing apparatus of claim 1, wherein the control device controls audio outputs from the at least one speaker based on one or more of rotation of the plurality of docking bays, activation of the at least one microphone, and direction of the plurality of docking bays.

12. The video conferencing apparatus of claim 1, wherein a display and camera of one of the one or more smart device are configured by the conferencing computing device base to enable one or more of viewing of participants of conference, change in control settings, change in direction of the plurality of docking bays, and change in manner in which conference is conducted.

* * * * *